US012190228B2

(12) United States Patent
Chai et al.

(10) Patent No.: US 12,190,228 B2
(45) Date of Patent: Jan. 7, 2025

(54) GENERATING AND EXECUTING CONTEXT-SPECIFIC NEURAL NETWORK MODELS BASED ON TARGET RUNTIME PARAMETERS

(71) Applicant: Latent AI, Inc., Menlo Park, CA (US)

(72) Inventors: Sek Meng Chai, Princeton, NJ (US); Jagadeesh Kandasamy, Cupertino, CA (US)

(73) Assignee: Latent AI, Inc., Menlo Park, CA (US)

( * ) Notice: Subject to any disclaimer, the term of this patent is extended or adjusted under 35 U.S.C. 154(b) by 931 days.

(21) Appl. No.: 17/237,569

(22) Filed: Apr. 22, 2021

(65) Prior Publication Data

US 2021/0241108 A1  Aug. 5, 2021

Related U.S. Application Data

(63) Continuation-in-part of application No. 17/016,908, filed on Sep. 10, 2020, now Pat. No. 11,816,568.

(60) Provisional application No. 63/018,236, filed on Apr. 30, 2020, provisional application No. 62/900,311, filed on Sep. 13, 2019.

(51) Int. Cl.
*G06N 3/063* (2023.01)
*G06N 3/045* (2023.01)
*G06N 3/08* (2023.01)
*G06V 10/70* (2022.01)
*G06V 10/764* (2022.01)

(52) U.S. Cl.
CPC ............. *G06N 3/063* (2013.01); *G06N 3/045* (2023.01); *G06N 3/08* (2013.01); *G06V 10/764* (2022.01); *G06V 10/768* (2022.01)

(58) Field of Classification Search
None
See application file for complete search history.

(56) References Cited

U.S. PATENT DOCUMENTS

| 2014/0089509 | A1* | 3/2014 | Akolkar | H04L 41/147 709/226 |
| 2014/0215471 | A1* | 7/2014 | Cherkasova | G06F 9/5066 718/102 |
| 2015/0012634 | A1* | 1/2015 | Zhu | H04L 67/303 709/223 |
| 2015/0286507 | A1* | 10/2015 | Elmroth | G06F 9/5061 718/104 |

(Continued)

*Primary Examiner* — Alan Chen
(74) *Attorney, Agent, or Firm* — Park, Vaughan, Fleming & Dowler LLP

(57) ABSTRACT

The disclosed embodiments relate to a system that generates and executes a deep neural network (DNN) based on target runtime parameters. During operation, the system receives a trained original model and a set of target runtime parameters for the DNN, wherein the target runtime parameters are associated with one or more of the following for the DNN: desired operating conditions, desired resource utilization, and desired accuracy of results. Next, the system generates a context-specific model based on the original model and the set of target runtime parameters. The system also generates an operational plan for executing both the original model and the context-specific model to meet requirements of the target runtime parameters. Finally, the system controls execution of the original model and the context-specific model based on the operational plan.

29 Claims, 16 Drawing Sheets

(56) References Cited

U.S. PATENT DOCUMENTS

| | | | |
|---|---|---|---|
| 2016/0055426 A1* | 2/2016 | Aminzadeh | G06N 7/01 |
| | | | 706/12 |
| 2016/0285966 A1* | 9/2016 | Brech | G06F 11/3433 |
| 2017/0091657 A1* | 3/2017 | Kida | G06N 20/00 |
| 2017/0124486 A1* | 5/2017 | Chan | G06F 16/248 |
| 2017/0220942 A1* | 8/2017 | Baldini Soares | G06N 5/04 |
| 2019/0122136 A1* | 4/2019 | Dirac | G06N 20/00 |
| 2020/0193266 A1* | 6/2020 | Scheidegger | G06N 3/04 |

\* cited by examiner

GENERATING AND EXECUTING CONTEXT-SPECIFIC NEURAL NETWORK MODELS BASED ON TARGET RUNTIME PARAMETERS

CROSS-REFERENCE TO RELATED APPLICATIONS

This application is a continuation-in-part of, and hereby claims priority under 35 U.S.C. § 120 to, pending U.S. patent application Ser. No. 17/016,908, entitled "Optimizing Execution of a Neural Network Based on Operations Performance Parameters," by inventors Sek Meng Chai and Jagadeesh Kandasamy, filed on 10 Sep. 2020. U.S. patent application Ser. No. 17/016,908 claims priority under 35 U.S.C. § 119(e) to U.S. Provisional Application Ser. No. 62/900,311, entitled "Dynamic Adaptation of Deep Neural Networks for Efficient Processing," by inventors Sek Meng Chai and Jagadeesh Kandasamy, filed on 13 Sep. 2019, which is hereby incorporated by reference. This application also claims priority under 35 U.S.C. § 119(e) to U.S. Provisional Application Ser. No. 63/018,236, entitled "Dynamic Adaptation of Deep Neural Networks for Efficient Processing," by inventors Sek Meng Chai and Jagadeesh Kandasamy, filed on 30 Apr. 2020, which is hereby incorporated by reference.

BACKGROUND

Field

The disclosed embodiments generally relate to techniques for improving the performance of artificial neural networks. More specifically, the disclosed embodiments relate to a technique for generating and executing context-specific neural network models based on target runtime parameters.

Related Art

Deep neural networks, which are built from dozens or hundreds of layers of artificial neurons, have proven to be quite effective at various pattern-recognition tasks, such as computer vision, speech recognition and natural-language processing. These deep neural networks typically operate by using multiple layers of neurons to progressively extract higher-level features from raw input. For example, in an image-processing application, lower layers of the neural network may identify edges, higher layers may identify arrangements of edges, and even higher layers may use semantic context in order to identify specific objects.

Deep neural networks tend to be computationally intensive because computational operations need to be performed to generate successive outputs for a large number of layers. This is not a significant problem if the deep neural network computations are performed on an enterprise computing system, which provides large numbers of computing cores and commensurately large amounts of memory and power budget. However, it is more of a problem to use such deep neural networks in resource-constrained environments, such as in edge devices, or portable devices, which only provide limited amounts of processing power, memory capacity and battery life.

In order to operate in such resource-constrained environments, researchers have investigated different techniques for selectively executing portions of a neural network model, or throttling execution of associated inference-processing operations. However, these existing techniques often do not perform well because it is complicated to efficiently manipulate large neural network models to facilitate selective execution or throttling.

Hence, what is needed is more efficient techniques for facilitating efficient execution of deep neural networks in resource-constrained computing environments.

SUMMARY

The disclosed embodiments relate to a system that generates and executes a deep neural network (DNN) based on target runtime parameters. During operation, the system receives a trained original model and a set of target runtime parameters for the DNN, wherein the target runtime parameters are associated with one or more of the following for the DNN: desired operating conditions, desired resource utilization, and desired accuracy of results. Next, the system generates a context-specific model based on the original model and the set of target runtime parameters. The system also generates an operational plan for executing both the original model and the context-specific model to meet requirements of the target runtime parameters. Finally, the system controls execution of the original model and the context-specific model based on the operational plan.

In some embodiments, the system deploys and executes the context-specific model at a location in a hierarchy of computing nodes, wherein the location is determined based on the target runtime parameters.

In some embodiments, the target runtime parameters are generated based on current operating conditions at the location in a hierarchy of computing nodes.

In some embodiments, information regarding the target runtime parameters, locations of the original model and the context-specific model in the hierarchy of computing nodes, and results produced by the original model and the context-specific model are stored at a common location in the hierarchy of computing nodes, wherein the information is used to control execution of the operational plan.

In some embodiments, the operational plan involves executing and obtaining results from the original model when results from the context-specific model do not meet requirements of the target runtime parameters.

In some embodiments, the original model and the context-specific model are executed on different devices in the hierarchy of computing nodes.

In some embodiments, the context-specific model is moved to a location in the hierarchy of computing nodes, which is closer to a data source for the context-specific model.

In some embodiments, the context-specific model is designed to operate within constraints of computing capabilities of a specific device in the hierarchy of computing nodes.

In some embodiments, the context-specific model performs inference operations that are specific to a particular user, and the original model performs inference operations that are not specific to a particular user.

In some embodiments, weights in the context-specific model are generated by quantizing corresponding weights in the original model, so that the weights in the context-specific model have a lower bit-precision than the corresponding weights in the original model.

In some embodiments, the context-specific model is trained to operate over a subset of the input range and/or a subset of the output range of the original model.

In some embodiments, the context-specific model is smaller than the original model, and the context-specific model is generated through a knowledge distillation technique, which uses the original model to train the context-specific model.

In some embodiments, the operational plan is generated to achieve one or more of the following: maximizing classification accuracy of the DNN; minimizing latency involved in executing the DNN to produce results; minimizing computational operations performed while executing the DNN; and minimizing power consumption while executing the DNN.

In some embodiments, generating the context-specific model involves generating different context-specific models based on different sets of runtime parameters.

In some embodiments, the operational plan switches among executing different context-specific models as the operating environment of the DNN changes.

DETAILED DESCRIPTION

Figure 1:
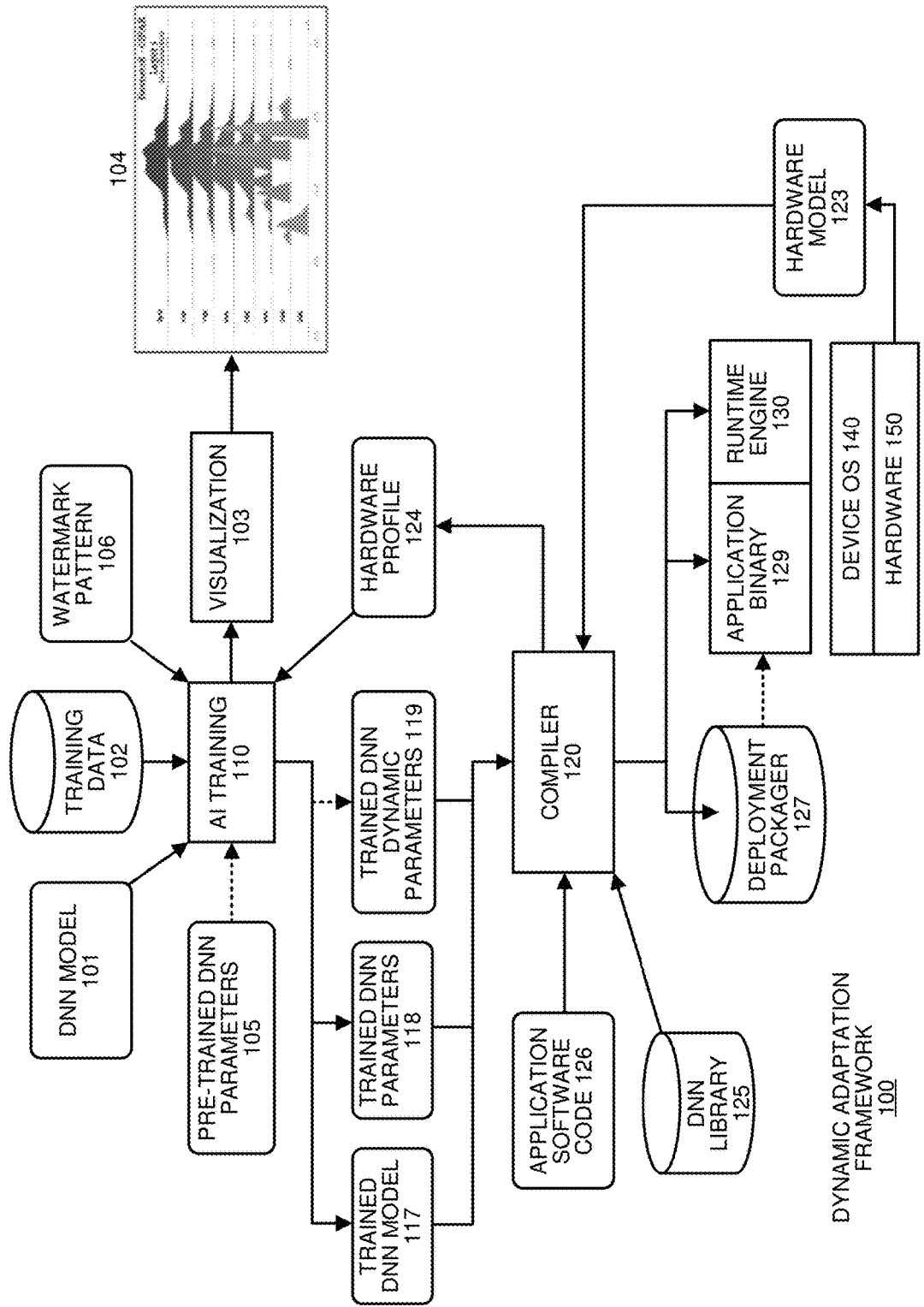
FIG. 1 illustrates a dynamic adaptation framework to facilitate the operation of deep neural networks on resource-constrained computing devices in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Dynamic Adaptation Framework Features

The dynamic adaptation framework for DNNs that is described in this specification includes a number of novel features, which are described below.

Dynamic Runtime Execution System

In DNNs, there is a need for runtime software to control throttling by running selected portions of a trained DNN. This runtime software can be automatically generated so the developer only needs to focus on application development rather than dynamic runtime settings for a DNN. This code-generation process can be accomplished using a compiler with insights obtained from executing a trained DNN. During operation, the system uses a runtime engine, which includes compiler-generated conditional code that selects paths to execute by selective masking. This technique also makes use of metadata information, which helps the runtime engine select and map compute resources based on current processor workload.

During execution, a throttling process selects which pathways should be traversed to accomplish a specific DNN task. By selecting and executing an appropriate subset of paths, the system approximates optimal DNN results. This technique is much akin to DNN quantization and pruning, but instead of removing the bits and edges from the DNN, we are masking the DNN so that the runtime engine can selectively execute portions of the DNN. Associated compression and encoding operations can be used to determine how many bits should be used for specific tasks.

Technique for Generating DNN Runtime Metadata

To facilitate efficient execution of the runtime engine, we need to automatically generate the runtime metadata without having to retrain the network. In one embodiment, this can be accomplished through post-training analysis of a pre-trained DNN to find the most effective paths through the DNN to produce desired results. For example, if certain object classes have very distinct features as compared with other classes of objects, they are likely to have orthogonal activations in the DNN, which allows for selective masking of the network without sacrificing overall accuracy. For example, cat/dog object classes may have separate and distinct visual features as compared with automotive vehicles. As such, separate masks can be generated to selectively execute cat/dog pathways to conserve on computing resources. We are essentially dynamically pruning the DNN by selectively processing the DNN nodes. This reduces power consumption and also improves processing latency.

In one embodiment, the effective paths in DNN can be trained to enforce the separation of filters for specific classes of objects during training. Selected DNN parameter weights are updated using clustering or dropout training procedures to utilized only portions of the network, and therefore, effective ensemble network paths are formed during training. For example, cat/dog object classes are trained as a dataset cluster to form a DNN ensemble, while automotive vehicle classes are trained as a separate dataset cluster to form a separate but connected DNN ensemble during training. The runtime metadata can be generated based on effective paths during DNN training. In an example embodiment, a hyperparameter for DNN training is used to determine the maximum number of dataset clusters and ensembles that affects the number of effective paths in the runtime metadata.

Current approaches involve pruning the DNN by removing DNN nodes and edges that are not statistically relevant. In our approach, rather than removing portions of the network, we selectively mask out the same portions of the network under control of the runtime system. During pruning, you are effectively short-circuiting a node or ensemble if the node or ensemble is removed. In contrast, when using runtime masks, the runtime engine selectively executes the node after DNN training, which is equivalent to the short-circuiting, but without removal of DNN nodes and edges that may be needed for operation in a different operational condition. Our approach maintains the learning capacity of the DNN while providing as efficient an computational workload as pruning.

Technique for Generating DNN Training Metadata

This technique facilitates communication between the AI training system and the compiler. Current approaches consider the training and compilation workflows to be separate. As such, the current approaches perform separate and disjoint optimizations during the AI training and compilation processes. These separate workflows can result in long development times, and typically produce results that are non-convergent or non-optimal, from an end-to-end workflow perspective. In contrast, integrating AI training and compilation into a single automated workflow facilitates joint optimization of AI training and compiler analysis operations.

AI training involves searching for DNN parameters that offer the best accuracy for a specific task. Given compiler information about which processing operations are more desirable (e.g., with respect to latency, power, and resource utilization), the AI training process can be optimized so that the DNN processing operations perform the more-desirable operations. During this compilation process, the compiler manages the hardware resources in which the inference processing occurs, and it can provide resource-utilization information to the AI training system to influence neural network architecture selection and/or weight selection accordingly.

This technique operates by first performing compiler graph analysis, and then generating feedback for the AI training system based on the analysis operations. The compiler uses a graph to store operational information (e.g. register allocation, computational dependencies, processing latency), and the associated analyses consist of best traversal path through the graph. The aggregated information from graph analyses (e.g. overall processing rate, power, resource utilization) can be provided to AI training for each DNN training iteration or epoch. The AI training may include a loss function that penalizes an increasing resource utilization feedback from the compiler. Current approaches may include a heuristic modeling to represent overall resource utilization during initialization of the AI training procedure. In contrast, our approach includes direct feedback during AI training procedure for a more optimal selection of DNN parameters and compiler output.

Moreover, compiler optimizations typically aim to provide certain execution guarantees, and the AI training generates results (e.g., selected bit precisions) that can help compiler optimizations improve these execution guarantees. For example, in one embodiment, the compiler provides feedback that a floating point operation is needed (e.g. floating point hardware and associated processing latency). After each training epoch, the DNN parameters values are calculated, and the compiler optimization generates DNN training metadata containing a list of overall resources needed for the set of calculated DNN parameter values. Based on the DNN training metadata, the AI training decides to quantize the parameter to an 8-bit integer value, which then frees up the floating-point resources in lieu of integer processing resources for the compiler to manage.

Technique for Executing a DNN Based on a Current Operational Context

The runtime engine determines a current operational context and then selects target runtime settings based on the current operational context. It is possible to obtain current runtime information from the computing system, such as processor utilization and memory bandwidth. However, this computing system information does not contain specific DNN runtime information that pertains to a current input. (For example, video images in a video input may be dark, which may cause inference performance to be low.) By obtaining specific internal details about how the DNN inference is operating, it is possible to throttle the DNN into a different operational state to achieve better algorithmic performance on a resource-constrained computing system. The DNN runtime operation is dependent on the input and the model (selected DNN architecture and trained weights). In one embodiment, our technique operates by extracting contextual features from both the input and the model's operational performance, and then based on these contextual features, generates an operational plan for a subsequent operational state. In another embodiment, our technique generates an operational plan based on available resource (e.g. power, compute resource, memory) to processing the DNN model.

The contextual features of the input can be analyzed by performing a coarse analysis on the input data. In an exemplary use case, the DNN's task is to detect objects in an image. For this use case, we can provide an additional DNN that is very small to work on a low-resolution (sub-sampled) image input. This small DNN can then provide contextual information, such as scene context (sky, ground, water, day/night, etc.) and event changes (e.g., motion change), which can be used to better control throttling operations for the DNN.

The DNN context can be extracted based on DNN activations or the DNN output, wherein this DNN context can be used to determine how the DNN is operating based on current DNN inputs. The DNN and input contexts can then be combined to form a current runtime state, which is sent to a planning agent to determine the most-efficient target runtime state.

In one embodiment, this contextual information is used to throttle at least three elements of the processing pipeline: (1) data frames, (2) data segmentation, and (3) semantic reasoning. In data frames, the system decides how many frames can be throttled down in a window of N frames. For example, in an object-tracking use case, suppose we detect the object in the first and last frames. If we can interpolate the motion between the first and last frames, we do not need to perform object-recognition computations for all N of the frames. The contextual information can also be related to the confidence of the object classification in the first frame. A higher confidence in the object classification may make it possible to skip more frames to reduce computing workload.

In data segmentation, the controller uses the DNN context to decide if all or part of the DNN needs to be processed. For high-confidence detection, it may be sufficient to process only a global context of the DNN (e.g., where only sub-sampled imagery is processed).

In semantic reasoning, the controller is coupled with a time-series network (e.g., LSTM, long short term memory) where object detections are resolved over the N frames. If frames are skipped, the LSTM (with its generative properties) can resolve state changes over the N frames. That is, if the system observes the first and last frames of an N frame window, the LSTM can predict the other states in the N frame window. However, for higher accuracy in prediction, intermediary frames may be needed (e.g., frames at quarter points N/4, N/2 and 3N/4).

Moreover, by capturing DNN contextual information, in some cases it may be possible to perform the DNN operations in a predetermined manner (i.e., for the next N frames). As such, the DNN can operate in a more deterministic manner, which facilitates prefetching and other mechanisms that could not be performed for a less deterministic computation.

Figure 16:
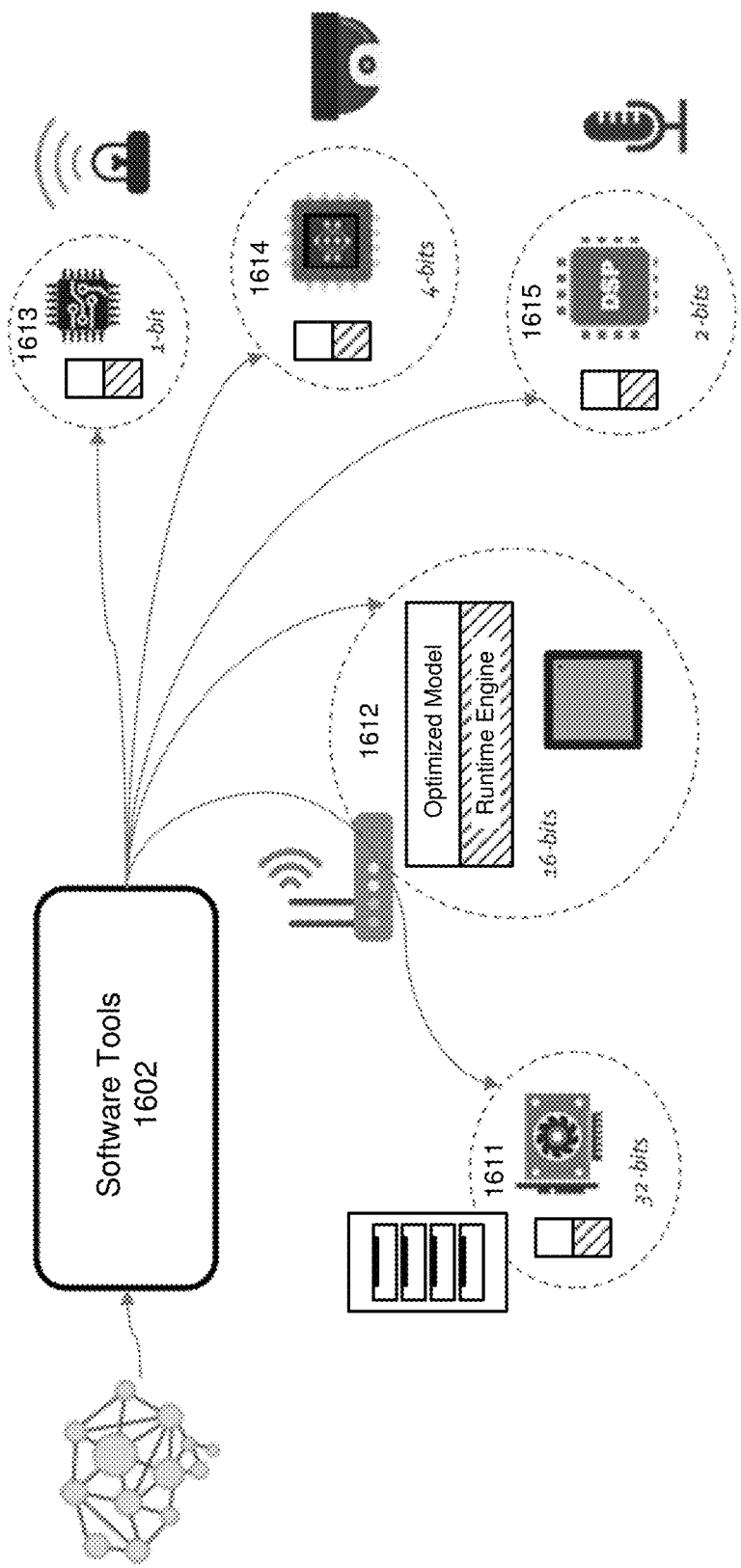
FIG. 16 illustrates an edge continuum in accordance with the disclosed embodiments.

In one embodiment, the runtime engines collect operational performance parameters, which are used by a deployment packager to update the DNN by training and optimizing the DNN model. This update is performed to improve the overall DNN performance and efficiency. During operation, a deployment packager decides to initiate this update based on a global system-level optimization over a hierarchy of computing nodes as is illustrated in FIG. 16. Referring to FIG. 16, a set of software tools 1602 generates a specially optimized DNN and an associated runtime engine for each target computing platform 1611-1615. These target platforms 1611-1615 form an edge continuum, wherein each target platform includes different resources and has different capabilities. Note that the deployment packager is responsible for determining whether a DNN will execute on a 4-bit platform 1614, a 16-bit platform 1612 or a 32-bit platform 1611.

During operation, DNN models can be transmitted to different target platforms to update a currently executing DNN, wherein these transmissions can be performed simultaneously. Note that pushing a DNN model to an edge device can significantly reduce the network bandwidth, which was previously required to execute a DNN model in the cloud. This is because the network bandwidth required to transmit a DNN model to an edge device is orders of magnitude lower than the network bandwidth required to transmit IOT data to the cloud. Moreover, during execution, each DNN collects inference results and operational parameters and communicates them back to software tools 1602 to help in updating the DNN model. The DNN and associated runtime engine remains operational on the hierarchy of computing nodes while the updated DNN is being optimized and deployed.

Figure 17:
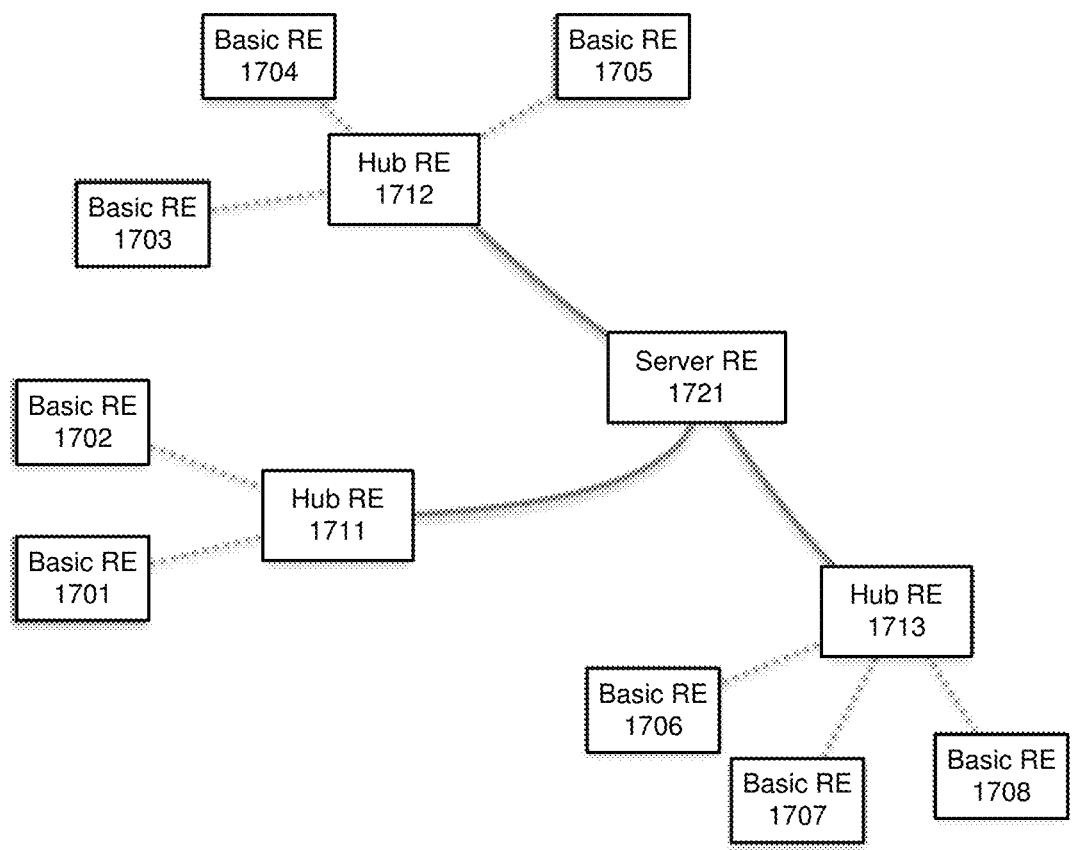
FIG. 17 illustrates a hierarchy of computing nodes in accordance with the disclosed embodiments.

FIG. 17 illustrates an exemplary hierarchy of computing nodes in accordance with the disclosed embodiments. This hierarchy includes a number of basic runtime engines (REs) 1701-1708, which can be located in edge devices, such as motion sensors, cameras or microphones. These basic REs 1701-1708 assume the existence of an associated intermediate or high-end device capable of delivering DNN models to basic REs 1701-1708 and collecting log information from basic REs 1701-1708. The hierarchy also includes a number of hub REs 1711-1713, which can be located in a network hub, and which include a modest hardware device, such as a Raspberry Pi™ that is capable of hosting an operating system such as Linux. Note that each hub RE 1711-1713 is capable of supporting a number of basic REs, which involves collecting their log data and, based on this information, triggering the uploading of new DNN models to them. Finally, the hierarchy includes a server RE 1721, which operates on server-class hardware and collects information from a number of hub REs 1711-1713. Server RE 1721 uses this collected information to retrain models on hub REs 1711-1713 if needed, and to manage the distribution of updated DNN models to hub REs 1711-1713.

The hierarchy of computing nodes illustrated in FIG. 17 can be used to implement a hierarchy of filters. For example, suppose we have a camera sensor. We first perform a filtering operation at an edge device (possibly located in the camera) to determine whether a human is present. If a human is present, we send the image to a higher-level filter in a more powerful computing device to determine whether the human is holding something. If the human is holding something, we send the image to an even more powerful computing device to determine what the human is holding. Is it an umbrella, a gun or a baseball bat? In this multi-layer approach, each successive filter requires more processing power, and the runtime engine needs to match each DNN model that implements a filter to an appropriate target hardware platform.

In another example, a home IOT system may include a doorbell camera and a driveway camera, wherein each camera is configured to look for different things. For example, the backyard camera may be looking for deer and the driveway camera may be looking for a car. In this example, a higher-power computing platform, such as a gateway, can be used to determine whether a deer, which was detected by the backyard camera, is coming or going.

Figure 18:
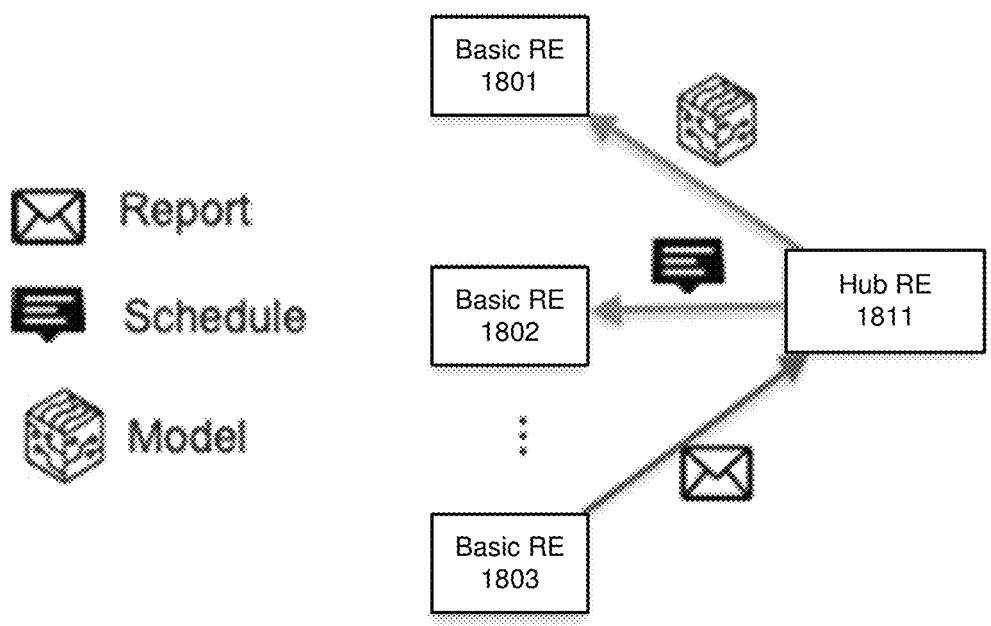
FIG. 18 illustrates different types of communications among computing nodes in a hierarchy of computing nodes in accordance with the disclosed embodiments.

FIG. 18 illustrates different types of communications among computing nodes in the hierarchy of computing nodes in accordance with the disclosed embodiments. More specifically, FIG. 18 illustrates how various items, such as reports, schedules and models can be communicated between a hub RE 1811 and basic REs 1801-1803. During operation, hub RE 1811 may request various data items from basic REs 1801-1803, such as inferences, accuracy parameters, and system loads. These requests are sent to a reporting unit within each basic RE 1801-1803, which continuously collects system data. In response to a request, a basic RE 1801-1803 can return a report, which comprises a collection of these operational performance parameters.

Hub RE 1811 can also send an inferential model to basic REs 1801-1803. For example, the inferential model can be a DNN, which includes a graph, associated parameters and an executable binary. Hub RE 1811 can additionally send a schedule for the execution of models to basic REs 1801-1803. This schedule describes a sequence of execution of the models in the basic RE's memory. If the basic RE has several models in its memory but no schedule, then those models can be executed in round robin order. A schedule can specify a policy, which determines when a model should be run, and how often it should be run. For example, a policy can specify that a person-detecting model should be run once per hour, and another policy can specify that one model should be run in the summertime and another model should be run in the wintertime.

The above-described system operates in a hierarchy of computing nodes and can be tailored for various application requirements. For example, if a specific application requires a large volume of data and the computing system does not provide enough bandwidth to send this large volume of data to the cloud, the system can send models to edge devices (basic REs) to filter the data, or to actually perform the inference-processing operations on the data. In another application, the objects that are being monitored can periodically change locations. In this case, the system tracks the locations of the objects and deploys models, which are specifically tailored for the objects, to edge devices that are located in proximity to the objects.

The deployment packager collects and generates operational performance parameters that can be used to optimize and train the DNN models by optimizing a loss function, such as the function listed below $$L(W) + \lambda_2 \sum_{i=1}^{N} \left\| W^{(i)} - \tilde{W}^{(i)} \right\|_2^2 + \lambda_3 \sum_{i=1}^{N} \left\| W^{(i)} \right\|_2^2 \quad \text{(Eq. 1)}$$

The first term L(W) is the main loss function, which is a typical loss function for DNN training. Note that the DNN training objective is to minimize this loss function, which improves DNN accuracy. The second and third terms are regularizer terms, which are used to guide the DNN training by providing mathematical constraints to the DNN parameter values $W^{(i)}$. In this case, the regularizer terms are used for quantization, for example to train the DNN to use 8-bit precision or lower instead of FP32 bit precision. The second term deals with keeping $W^{(i)}$ and $\sim W^{(i)}$ close together (e.g., FP32 and INT8 values should be close together so as to reduce the loss due to differences in bit-precisions). The third term deals with keeping $W^{(i)}$ values small and close to zero. The lambda values ($\lambda_2$ and $\lambda_3$) are hyperparameters for DNN training, which set the weighting for the second and third terms.

If the operational parameters indicate poor operational performance, this means the presently deployed model is not working well. Operational performance parameters can be used to improve DNN model performance and efficiency. In this case, we can reduce the lambda values $\lambda_2$ and $\lambda_3$ so that they have less effect on the accuracy. This effectively relaxes the training function so that performance can increase.

Technique for Watermarking a DNN

Once a DNN is trained and deployed, a developer or user may want to identify the DNN to ascertain its origins. For example, in an AI marketplace, you may want to only use a DNN from a reputable source, or use DNNs that are generated and quantized by a reputable tool maker. Furthermore, one might want to know that the models are not tampered with (e.g., to prevent attacks where bits in the DNN parameters are manipulated).

Our watermarking technique operates by encoding information in parameters of a DNN to facilitate verifying its authenticity and securing its validity. This technique generally operates by encoding a watermark pattern in DNN weights by constraining the possible values for weights during training. In one embodiment, the constraining the possible values can be achieved by optimizing a loss function as described in Eq.1, where regularizer terms guide DNN parameter value during training based on the watermark pattern. The training operation can also use parameter values of a pre-trained DNN. At runtime, an associated decoder in the runtime engine can dynamically verify the authenticity of the DNN by verifying the watermark, which involves decoding the DNN watermark based on the quantized values of the DNN parameters.

This watermarking technique supports brand sustainment and security of the DNN models. Moreover, it allows the DNN model to be time stamped and labeled based on the tool flow. Current approaches encrypt the DNN model and associated metadata files (e.g. timestamp and tool flow information). In contrast, our approach directly embedded the watermark, timestamp, and metadata information into the DNN parameter values, and thus reduces the attack surface for tampering. The DNN model is still operable with the embedded watermark because it is quantized accordingly during AI training.

Technique for Compressing a DNN

This technique compresses the weights of a DNN based on a dictionary, which includes entries that contain values for specific weights, wherein the entries can be referenced through a shorter index, which is used to encode the specific weights. Also note that the encoding of the weights can be changed during the AI training process to reduce the size of the dictionary.

Note that if only power-of-two values (2, 4, 8, 16, . . . ) are used to represent DNN weights, there exists only a small set of possible values for the weights. A simple compression routine (e.g. ZIP or 7zip) can be used to analyze the possible values and compress all of the weights, but this is neither guaranteed nor necessarily optimal. Our technique operates by preselecting a symbol table, which defines the available values for weights (e.g. power-of-two) that can be used during DNN training. This dictionary (or lookup table) includes entries for the available values that are mapped to specific symbols. Each symbol is basically a compressed encoding (or dictionary index) that represents the available values. For example, if the only power-of-two values are 2, 4, 8, and 16, we only need to use a two-bit symbol to encode these four possible power-of-two values. During runtime inferencing, the dictionary can be used to look up the encoded power-of-two values based on their associated two-bit symbols. Note that we can also tie the encoding to a training process so that efficiency in encoding and decoding guides the target AI training and quantization operations.

Hence, this specialized encoding technique can greatly improve compression of DNN parameter files. In one embodiment, a decoding procedure during runtime inferencing can be performed by available processor hardware. In another embodiment, a software decoding procedure is generated by a compiler, wherein the software operates a lookup table with a hash table of the available values. In yet another embodiment, the compiler generates software specifically based available values (e.g. power-of-two values for multiplication in DNN processing can be represented as bit-shifting operation, wherein the amount of shifts are based on DNN parameters trained to use only power-of-two values).

Visualizing DNN Training Results Across Different Bit Precisions

Our DNN training system trains the DNN using quantized bit-precision, and also with special encodings such as power-of-two values. In such systems, there is a need to visualize how bit precision affects the distribution of weights in the DNN layers. Because we test DNN accuracy during the quantization process, we have results based on changing bit precision for different DNN models/layers. We can use these results to produce a visualization of the accuracy versus bit precision, which can help to determine how bits are used to represent the range and sparsity of values. Such a visualization can be useful in explaining the operation of the DNN model, as well as highlighting filters and layers in the DNN that are more prone to quantization.

For example, a visualization of the confusion matrices and their relationships with changing bit precision can highlight the sensitivity of the object classes. This can help developers improve DNN performance by grouping similar objects and creating hierarchy in the classification layers. This visualization facilitates user interaction with the underlying tools, whereby the user can provide input regarding a target bit precision. For example, by grouping two object classes such as dogs and cats as a new object class called "small pets", the AI training can achieve higher quantization levels because the DNN model does not need to use more bits to separate the dogs and cats as separate objects.

Our visualization technique operates by first training and testing the accuracy of a DNN using different bit precisions for DNN weights. Next, the technique displays a histogram of the DNN weights and associated accuracies for each of the different bit precisions. This facilitates visualizing how bit precision affects discrimination capabilities of the DNN. For example, see FIGS. 13-15, which are described in further detail below.

Processing Inferences in a DNN Using Bit Planes

DNNs operate by performing convolutions (matrix multiply, summation), followed by pooling and non-linear activations. Most approaches to making such inference-processing operations efficient deal with reducing bit-width (e.g., from floating point to 8-bit or lower-bit precision). It may also be possible to use approximations with respect to the computation (i.e., dealing with the pooling and non-linear activations using operations such as tan h and RELU).

We have previously shown that a DNN can be trained to have weights that only have power-of-two values. The most straightforward computational mapping may be to use bit-shifts rather than integer multipliers. However, we can further approximate the computations via bit plane manipulations.

DNN tensors are typically defined with respect to NWHC (batch size N, width W, height H, and channel C), wherein "batch size" refers to the number of image frames; "width" and "height" refer to the x and y dimensions of the image frame, respectively; and "channel" refers, for example, to the color channels R, G, and B.

We can separate the DNN tensor further into bit planes, including MSB and LSB planes. Computations for the DNN tensor can be represented with a control graph, governed by the bit planes. Approximations can be performed by selecting particular computations, as described in the control graph, wherein selection is based dictated by the values in the MSB and LSB planes.

When the weights are power-of-two values and we only need a few bits to represent the weights, then it might make sense to resolve the computation by looking at individual bits. For example, if the weight values use only three bits, we have three bit planes, which can be resolved using three separate binary tensor operations. The bit planes do not have to consecutive, with respect to their associated value encodings (e.g. we can use bit planes 1, 3, and 5 of the DNN tensor). Hence, you can resolve the first MSB bit plane first, then the second MSB bit plane, and then the third (i.e., LSB) bit plane. For each bit plane, because we are doing only binary calculations, we can resolve the matrix multiplication and summation operations using a bit-counting process. Therefore, convolutions in a bit plane can be reduced to bit-counting. (Note that we are essentially "unrolling" the multiply/add operations.) We can resolve the pooling and non-linear activations by using the three bit-planes as the new input vectors. Moreover, the bit planes can be fused by bit-shifting the bit planes based on the MSB values. Alternatively, the second and third bit-planes can be ignored (approximated away) and only the MSB bit plane can be analyzed.

In this example embodiment, we approximate the multiply/add operations in DNN tensors using binary tensor operations, operable in bit-planes. Hence, we can reduce multiply/add operations to bit-counting using power-of-two values, with only a few total bits selecting the computations defined in the control graph.

Explainability

During runtime operation of the neural network, our framework can perform a profiling operation to keep track of all pathways the neural network activates while making an inference, such as classifying a car. This information can be used to gain insight into how the neural network makes a specific inference. For example, say we have a neural network that recognizes objects in an image, such as a car, a dog or a bicycle. During the profiling process, the system can keep track of how many different pathways in the neural network are activated while recognizing a car. Hence, the above-described profiling process essentially produces an activation heat map, which indicates that a specific pathway is being hit a lot. The pathways represent the visual features that are representative of the object.

If an erroneous inference is detected (e.g. via user input or other DNN inferences), then the erroneous pathway indicates the visual features that produces the erroneous inference results. A comparison of the erroneous pathway against the activation heat map can show locations where the erroneous pathway differs from the statistical distribution of pathways in the activation heat map. To improve DNN accuracy, we can generate additional training data specifically to correct the area where there is a difference in the pathways (e.g. against the heat map). The additional training data can be synthesized using a generative adversarial network (GAN) training methodology.

Hence, the above-described profiling process and the generation of the activation heat map essentially produces an explanation of how the DNN produces an inference result. The process in comparing the erroneous pathways essentially produces an explanation of how the DNN is not robust to that input data set. The process in producing additional data, through data collection or synthesis using GAN, is essentially an adversarial training approach to make the DNN more robust based on profiling process.

In one embodiment, the runtime engine is generated with a compiler to collect data to generate the activation heat map. The runtime engine produces an explanation of the DNN operation. The explanation can be used by a user or deployment packager to initiate adversarial training and generate a more robust DNN. The deployment packager can dispatch the more robust DNN for operation in the field.

Quantization and Processing Based on Tensor Splitting

Many important neural-network models, trained on complex datasets, are not easy to quantize post-training. This is because certain tensors require both range and local resolution that are difficult to achieve using post-training quantization at an 8-bit precision level or below. For example, it is hard to quantize the Depthwise Conv2D layers that are present in MobileNets neural networks because in these layers the weights often vary across a wide range, resulting in loss of information during quantization.

To reduce this information loss, we perform quantization based on a tensor-splitting technique, so that a tensor for a Depthwise Conv2D layer with a large range of values will be split into two sub-tensors. A first sub-tensor clips the range of the weights to a small set of values around the peak distribution, and zeroes out the rest of the "outlier" values. The peak distribution is where most of the tensor values are centered upon. In many cases, the peak distribution is centered around the zero value. The second sub-tensor maintains the outlier values and zeroes out the center values. The goal of this technique is to have the first sub-tensor capture all the important details of the majority of the weights, which are small and centered around the peak distribution, while enabling the second sub-tensor to accurately capture the effect of the outliers.

The splitting threshold associated with this tensor-splitting technique can be determined in a number of ways. In one example, values in a tensor can be split based on how close they are to the mean value of the peak distribution. This can involve splitting based on standard deviation or splitting based on percentile. For example, while splitting based on standard deviation ($\sigma$), the threshold values can be (mean−2$\sigma$, mean+2$\sigma$).

A similar algorithmic tensor-splitting technique involves: (1) splitting the range of the tensor weights into 256 bins; (2) choosing the bin with the mean value as the starting point; (3) moving outward from this starting point left and right, and checking the number of weights in each bin; and (4) using the midpoint of the first encountered empty bin as a threshold value for the splitting.

As mentioned previously, the tensor can alternatively be split into more than two sub-tensors based on multiple peaks in the distribution, wherein each of the more than two sub-tensors is separately quantized using different quantization parameters. Also, to improve performance while subsequently executing the DNN, the first sub-tensor and the second sub-tensor can be selectively computed to dynamically adjust the number of computational operations involved in executing the DNN. The information related to the sub-tensor can be included in runtime metadata to identify portions of the DNN to be selectively executed at runtime. The operational performance of the DNN based on the selected sub-tensors can be reported in the operational performance parameters for use in optimizing the subsequent training of the DNN. Generated operational plan may include the selection of sub-tensors for processing at different intervals. Selected sub-tensors may contain information regarding a watermark pattern encoded during the training process in specific sub-tensors.

Training a Controller to Manage Dynamic Execution of a TNN

As mentioned above, it is often advantageous to dynamically throttle (gate or turn off) portions of a neural network during runtime execution of the neural network in resource-constrained computing devices, which only provide limited amounts of processing power, memory capacity and battery life. In order to facilitate this type of dynamic execution, we have trained both a throttleable neural network (TNN) and an associated context-aware controller that dynamically manages execution of the TNN. A throttleable neural network (TNN) is a neural network that has operational runtime states to achieve better algorithmic performance, for example, via selective activation of modules or sub-tensors in the TNN. A context-aware controller is a runtime engine that operates to select the different operational states of the TNN, wherein the runtime engine can be generated by a compiler based on metadata associated with the TNN. The context-aware controller may be coupled with hardware mechanisms, such as cache, prefetching and other processing elements.

This context-aware controller can be trained using reinforcement learning techniques to selectively activate throttleable modules in the TNN to facilitate execution of specific activation paths. During the training process, our system receives a training data set comprising training examples, wherein each training example comprises an input to the TNN, an output from the TNN and corresponding activation paths through the TNN, which were generated in response to the input. Next, the system uses the reinforcement learning technique to train the controller based on the training data set and a reward function to selectively activate throttleable modules in the TNN to facilitate execution of the activation paths. After training, the controller can be compiled and incorporated into a runtime engine for the TNN. Note that the reward function can balance a number of different objectives, including: maximizing classification accuracy of the TNN; minimizing computational operations performed while executing the TNN; minimizing power consumption of a device, which is executing the TNN; and minimizing latency involved in executing the TNN to produce an output.

In some embodiments, the context-aware controller is trained based on solving a contextual bandit problem. However, many other types of reinforcement learning technique can be used.

In some embodiments, the context-aware controller is composed of policies generated based on a planning agent as described elsewhere in his document. In another embodiment, the context-aware controller may take as inputs, system-level inputs such as battery-levels, available network bandwidth, and memory utilization, to select policies for the TNN. In yet another embodiment, the context-aware controller may select a first and second sub-tensor, as described elsewhere in this document, for executing the TNN to produce an output.

Dynamic Adaptation Framework

FIG. 1A illustrates a dynamic adaptation framework 100 that facilitates executing deep neural networks on resource-constrained computing devices in accordance with the disclosed embodiments.

Figure 2:
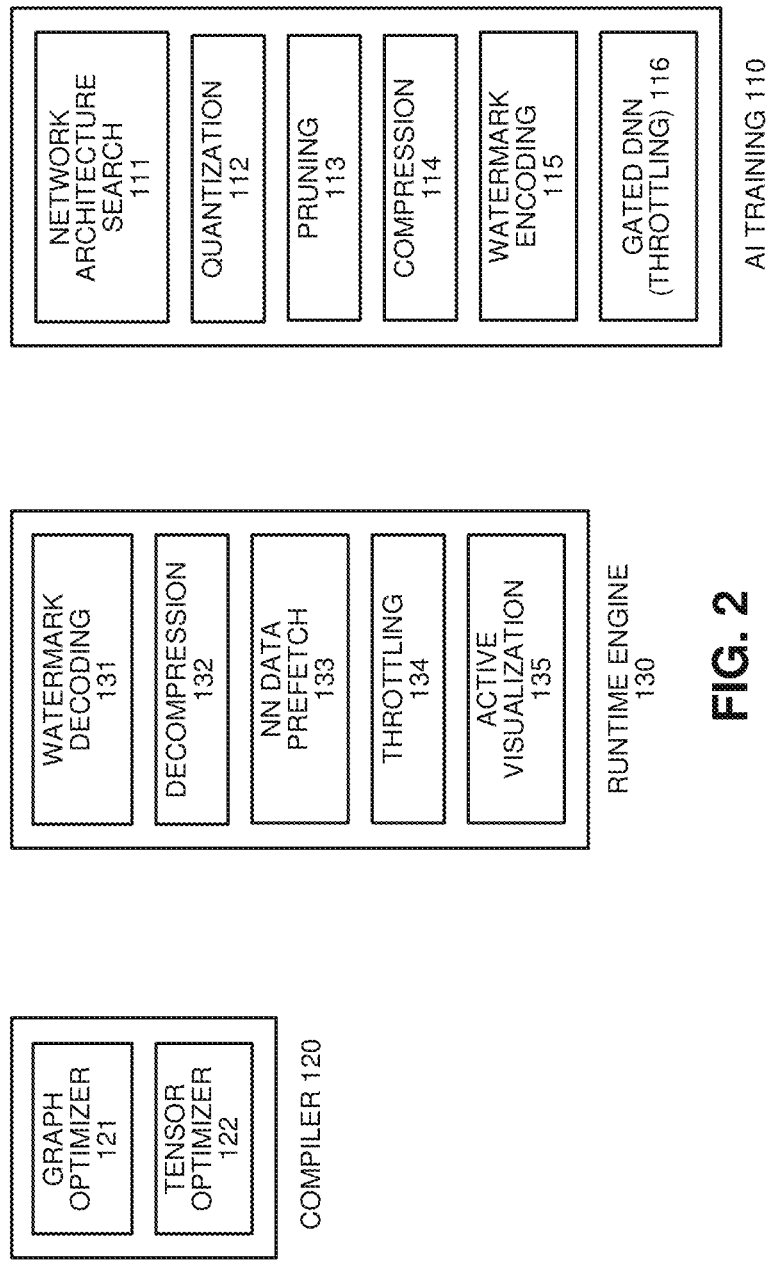
FIG. 2 illustrates the internal structure of several modules from FIG. 1 in accordance with the disclosed embodiments.

At the top of FIG. 1A, an AI training system 110 comprises a framework for machine learning, and also incorporates math libraries for DNN training. Referring to FIG. 2, AI training system 110 includes a number of components, including a network architecture search module 111, a quantization module 112, a pruning module 113, a compression module 114, a watermark encoding module 115 and a gated DNN module 116. Network architecture search (NAS) module 111 automates the design of DNN, including selection of hyperparameters (e.g., filter width, DNN depth). NAS module 111 implements strategies to reduce search space and to provide performance estimates. It can also use hardware profile 124 to select a DNN architecture that reduces resource utilization while maintaining performance. Quantization module 112 quantizes the values for DNN parameters to reduce the memory footprint. Pruning module 113 reduces the number of nodes and connections in the DNN to reduce DNN size. In doing so, it can use information from hardware profile 124 to set the threshold on which DNN elements are pruned. Typically, this threshold is set based on the sparsity of values (i.e., lots of zero values may indicate that the DNN element may not typically activate). By using hardware profile 124, the threshold can be set based on computational and memory resources, in addition to the sparsity. Compression module 114 compresses the DNN into a serialized bit stream. It can set the number of symbols used to represent weights by performing weight-value selection, thereby reducing the number of symbols (e.g., values) during training. Watermark encoding module 115 enforces an encoding of watermark pattern 106 into DNN parameters during training. This involves selecting target values for specific DNN parameters based on the watermark pattern 106. Gated DNN module 116 trains the DNN such that the DNN is robust to runtime dropout. Gated DNN module can generate trained DNN dynamic parameters 119 using a planning agent algorithm. Gated DNN module 116 can be coupled with NAS module 111 to identify specific DNN layers for throttling. This module can also take inputs from hardware profile 124 to determine the level of throttling. For example, less hardware resource availability as indicated in hardware profile 124 would suggest a higher level of throttling.

During operation, AI training system 110 receives a number of inputs, including a DNN model 101, which describes a DNN architecture, including descriptions of each layer, neuron type, and connectivity. It also receives training data 102, comprising a prepared data set, which is used to train the neural network. It also receives pre-trained DNN parameters 105, which have been previously generated during AI training. Note that the values of these parameters may be quantized for low bit precision, and can optionally serve as initialization values for AI training system 110. AI training system 110 can also receive a watermark pattern 106, which can be encoded into the DNN during AI training.

Figure 13:
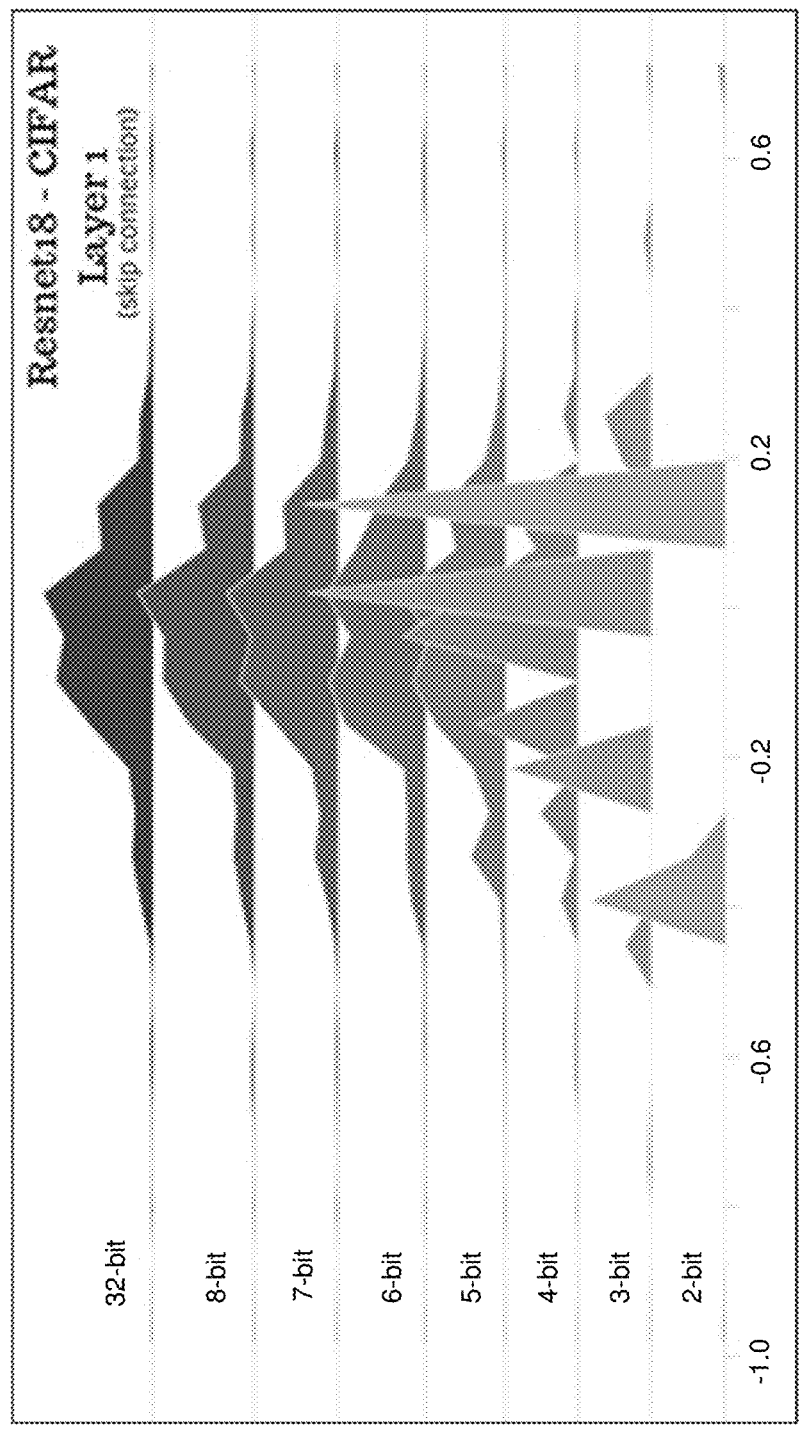
FIG. 13 illustrates a magnified version of a display output in accordance with the disclosed embodiments.

The output of AI training system 110 feeds into a visualization module 103, which generates a display output 104 that facilitates visualizing the output of the DNN based on varying bit precision (i.e., intra or inter DNN layer). Exemplary display output 104 presents a histogram of parameter values of a DNN layer, across different bit-precision settings. Note that a poor distribution of parameter values (e.g., with many gaps) often leads to difficulty in classifying objects that have visually similar features (e.g., cat and dog may have similar visual features). A magnified version of display output 104 is illustrated in FIG. 13.

Figure 14:
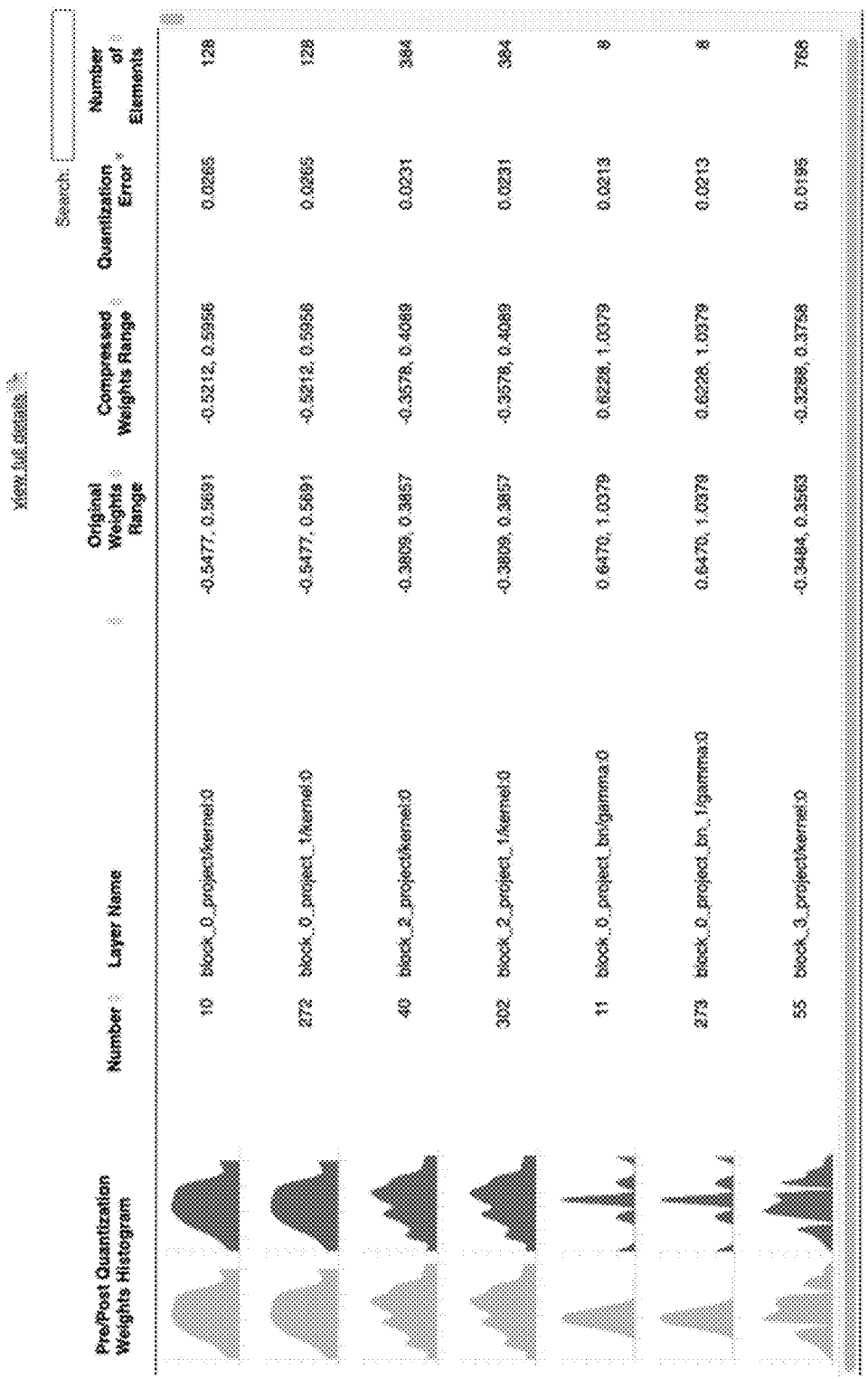
FIG. 14 illustrates an exemplary compression report in accordance with the disclosed embodiments.
Figure 15:
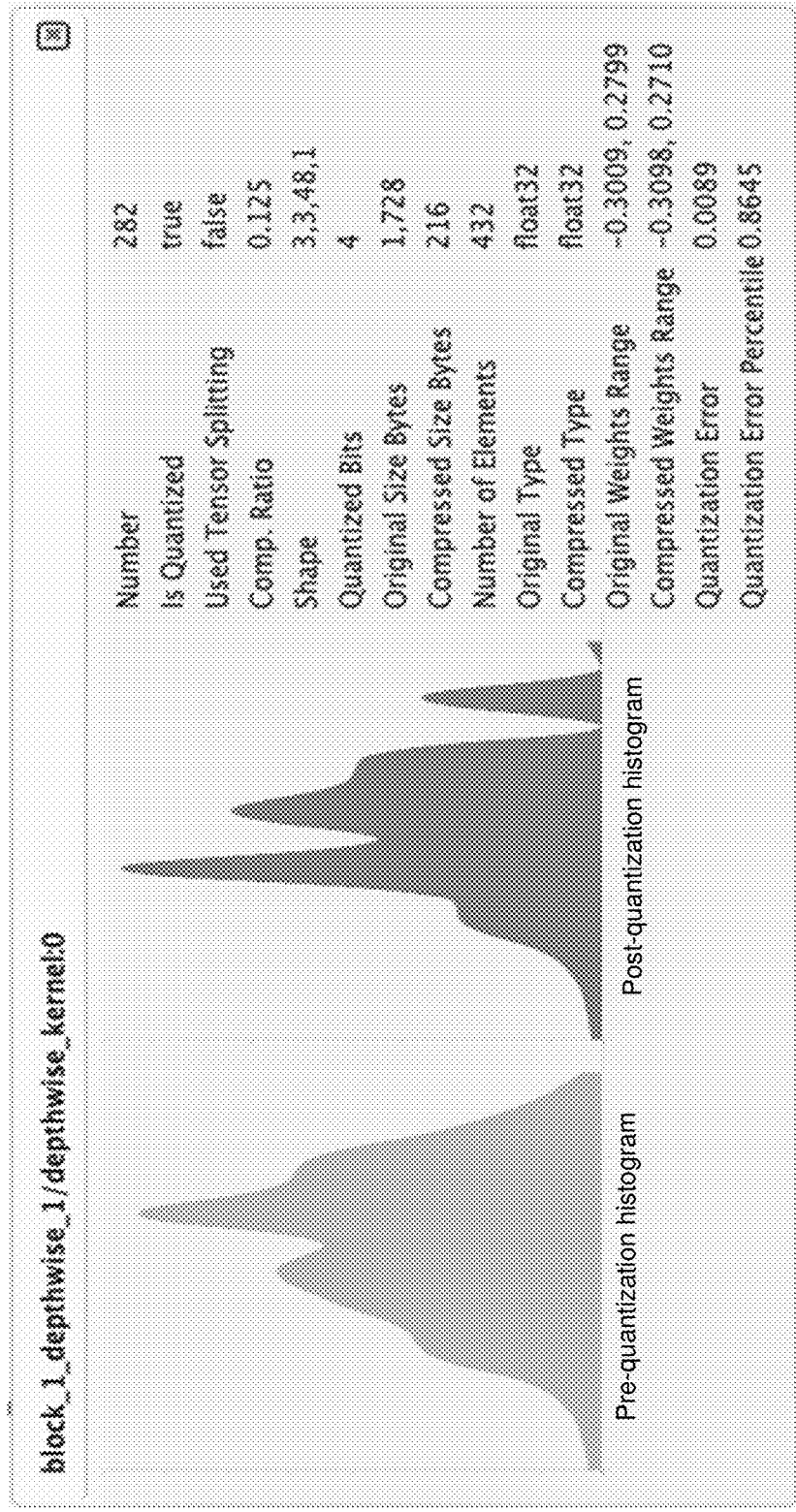
FIG. 15 presents a diagram showing a detailed compression report for one tensor in accordance with the disclosed embodiments.

Visualization module 103 can also generate outputs that illustrate the effects of quantization. For example, FIG. 14 illustrates an exemplary compression report, which includes entries for all of the tensors in a DNN. More specifically, this report presents a histogram of weight values for each tensor in the DNN. The left-hand tensor is pre-quantization and the right-hand tenser is post-quantization. The "weight range values" provide ranges of weights for each tensor that is quantized. The "quantization-error values" provide the average difference between pre-quantization and post-quantization weight values. FIG. 15 presents a more detailed report for a single tensor, wherein the left-hand histogram in the report is pre-quantization and the right-hand histogram is post-quantization. The right-hand side of the more detailed report presents specific parameters for the tensor.

AI training system 110 generates a number of items that feed into compiler 120, including: a trained DNN model 117, trained DNN parameters 118, and trained DNN dynamic parameters 119. Trained DNN model 117 comprises a trained DNN model and associated DNN architecture. It is based on DNN model 101, which can be augmented by NAS module 111. It may also include graph information related to low-bit precision, generated by quantization module 112. Trained DNN parameters 118 include the weight values for the DNN parameters. Note that these values may be generated to facilitate low-bit precision operation by quantization module 112.

Trained DNN dynamic parameters 119 include dynamic operational information for compiler 120, including mask information generated by gated DNN module 116 which can be used to throttle the DNN during inferencing operations. The compiler 120 generates code operational as a controller in the throttling module 134 based on the trained DNN dynamic parameters. It can also include information generated by watermark encoding module 115 and compression module 114. During operation, gated DNN module 116 can ingest pre-trained DNN parameters 105 to generate trained DNN dynamic parameters 119. We illustrate the input/output to the AI training system 110 with dotted lines to indicate an alternative workflow, which starts with pre-trained DNN parameters 105.

Compiler 120 also receives application software code 126 and inputs from DNN library 125. Application software code 126 comprises program source code, which for example, can be produced by an application developer. DNN library 125 stores results generated by compiler 120, including application binary 129 and runtime engine 130.

DNN library 125 enables compiler 120 to use previously compiled results to generate a new application binary 129 and runtime engine 130. Compiler 120 can also use previously compiled results from DNN library 125 to generate hardware profile 124 to facilitate subsequent AI training.

Compiler 120 translates program code and other codified sources (e.g., DNN graph descriptions) into executable binaries for processing on hardware 150. During operation, compiler 120 receives as inputs: trained DNN model 117; trained DNN parameters 118; trained DNN dynamic parameters 119; application software code 126; and inputs from DNN library 125. Using these inputs, compiler 120 generates application binary 129 and runtime engine 130, which are operable on device operating system 140 and hardware 150.

Note that compiler 120 can ingest a hardware model 123 for use in generating application binary 129 and runtime engine 130. It can also use hardware model 123 to generate a hardware profile 124 for use by AI training system 110. Hardware model 123 contains information about the hardware 150 (e.g., compute and memory resource available, instruction set architecture). Hardware profile 124 is generated by compiler 120 to facilitate operation of AI training system 110. Hardware profile 124 contains information about how the hardware resources are used based on application binary 129, trained DNN model 117, trained DNN parameters 118 and trained DNN dynamic parameters 119.

Compiler 120 is responsible for resource mapping program code (generated by a developer) or DNN inference graphs in trained DNN model 117 into application binary 129. Referring to FIG. 2, compiler 120 can include a graph optimizer module 121 and tensor optimizer module 122. Graph optimizer module 121 analyzes control flow graphs and data dependencies in order to parallelize computation. In doing so, graph optimizer 121 determines hardware resources (e.g., compute elements and register storage) that are needed to best process the DNN. It also generates portions of the binary code to perform the DNN inference calculations (e.g., multiplication, bit-shifting, comparisons). Tensor optimizer module 122 analyzes the tensor structure (e.g., size, shape, location) to facilitate data loads and stores. In doing so, tensor optimizer 122 generates the data movements necessary to create data streams for the hardware compute elements. Hence, it generates portions of the binary code related to memory transfers and packing of the associated data into streams (e.g., load and store instructions coupled with stride and skip patterns in memory).

Compiler 120 can use trained DNN dynamic parameters 119 to determine operational conditions and constraints, to generate the executable binaries. Hence, trained DNN dynamic parameters 119 can be considered to be compiler directives (e.g., pragmas) that provide additional information to select various compiler optimizations (e.g., vectorization and loop unrolling). Compiler 120 also generates information in the hardware profile 124, including information related to hardware resource utilization, memory bandwidth availability, and power consumption, based on output of the graph optimizer 121 and tensor optimizer 122. The compiler 120 generates code for the application binary 129, runtime engine 130, and the deployment packager 127.

Deployment packager 127 provides storage for application binary 129 and runtime engine 130. Deployment packager 127 can store different code versions for later deployment (e.g., over-the-air releases), shown with the dotted line to application binary 129 and runtime engine 130. Deployment packager 127 may initiate adversarial training (e.g. using AI training 110) and compilation (e.g. using compiler 120) based on results from runtime engine 130, in which the adversarial trained DNN is stored for later deployment.

Runtime engine 130 comprises executable binaries generated by compiler 120 to perform common functions to facilitate DNN inferencing operations, including functions for data processing generated by the graph optimizer 121, and instructions for stream data movement, generated by the tensor optimizer 122. As illustrated in FIG. 2, runtime engine 130 includes: watermark decoding module 131, decompression module 132, DNN data prefetch module 133, throttling module 134 and active visualization module 135. Watermark decoding module 131 comprises code that decodes a watermark pattern in the trained DNN parameters 118, which was previously encoded by watermark encoding module 115. Decompression module 132 comprises code that decompresses the trained DNN parameters 118 based on a scheme defined in compression module 114. DNN data prefetch module 133 comprises code to load, store, and pack data into streams for processing. Throttling module 134 comprises code that constitutes a controller, which uses sensor data to dynamically determine operational conditions of the DNN inference. The controller may collect profile data to generate activation heat maps to provide explanations of DNN inference. In addition, code within throttling module 134 performs approximations for functions in the DNN inference. Active visualization module 135 includes code that provides an output of the DNN inference, which shows the activation paths that lead to the DNN output (e.g., classification results). These activation paths can be related to the throttling (e.g., selected paths that are turned on for processing). If the confidence results of the DNN output are low, and the activation paths indicate there are additional pathways for DNN activations, then throttling module 134 can increase the compute-level to improve DNN output results. Display output module 136 includes code that generates a visual display of activation paths of the DNN during inference. Note that these DNN activation paths can help to explain DNN behavior (e.g., why did DNN choose particular output instead of another to facilitate throttling operations performed by throttling module 134).

Flow Charts

Figure 3A:
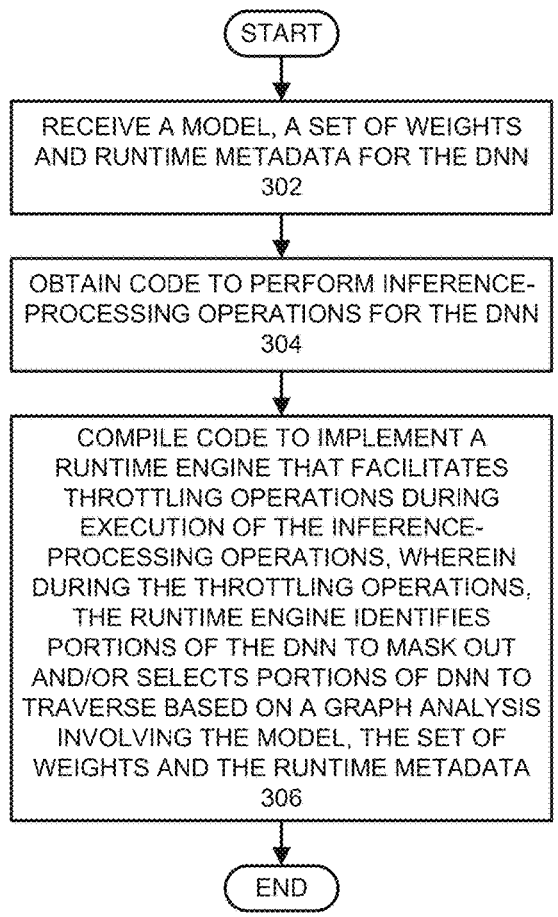
FIG. 3A presents a flow chart illustrating operations performed while facilitating dynamic runtime execution of a DNN in accordance with the disclosed embodiments.

FIG. 3A presents a flow chart illustrating operations performed while facilitating dynamic runtime execution of a DNN in accordance with the disclosed embodiments. During operation, the system receives a model, a set of weights and runtime metadata for the DNN (step 302). Next, the system obtains code to perform inference-processing operations for the DNN (step 304). Finally, the system compiles code to implement a runtime engine that facilitates throttling operations during execution of the inference-processing operations, wherein during the throttling operations, the runtime engine identifies portions of the DNN to mask out and/or selects portions of the DNN to traverse based on a graph analysis involving the model, the set of weights and the runtime metadata (step 306).

Figure 3B:
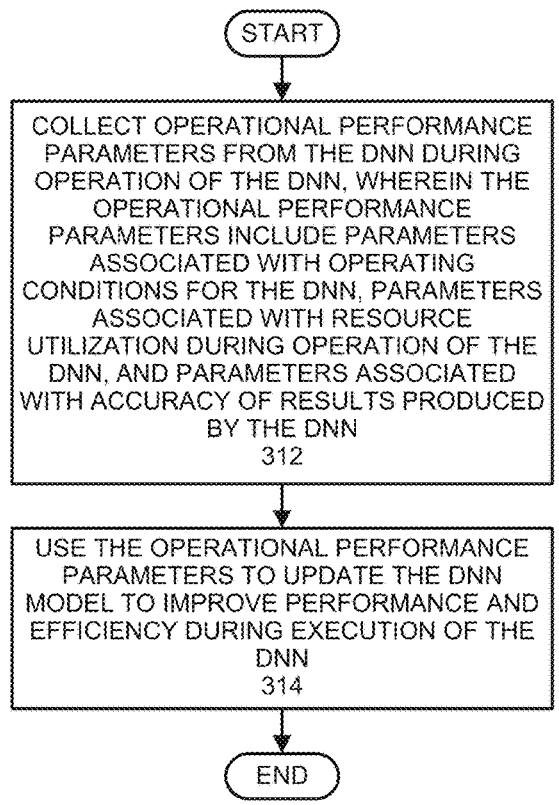
FIG. 3B presents a flow chart illustrating operations performed while optimizing execution of a DNN based on operational performance parameters in accordance with the disclosed embodiments.

FIG. 3B presents a flow chart illustrating operations performed while optimizing execution of a DNN based on operational performance parameters in accordance with the disclosed embodiments. During operation, the system collects operational performance parameters from the DNN during operation of the DNN, wherein the operational performance parameters include parameters associated with operating conditions for the DNN, parameters associated with resource utilization during operation of the DNN, and parameters associated with accuracy of results produced by the DNN (step 312). Next, the system uses the operational performance parameters to update the DNN model to improve performance and efficiency during execution of the DNN (step 314).

Figure 4:
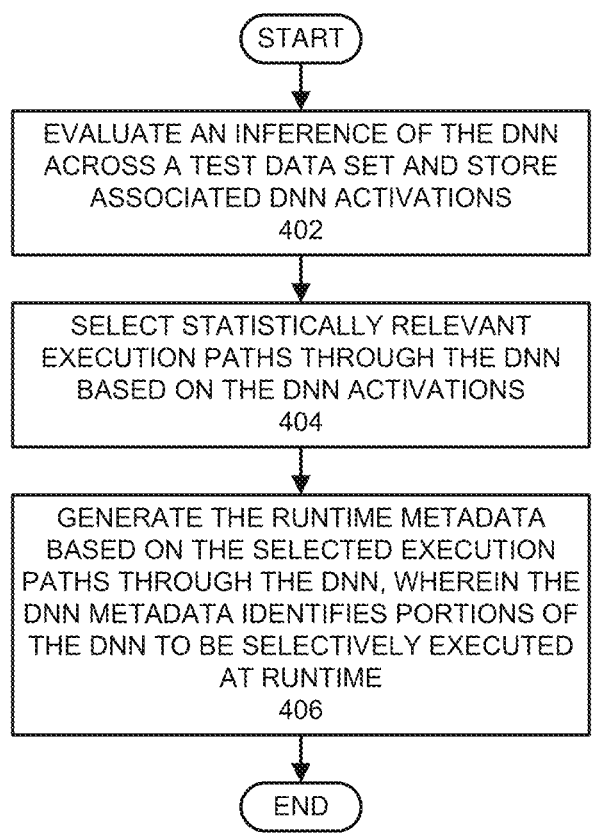
FIG. 4 presents a flow chart illustrating operations performed while generating runtime metadata for a DNN in accordance with the disclosed embodiments.

FIG. 4 presents a flow chart illustrating operations performed while generating runtime metadata for a DNN in accordance with the disclosed embodiments. During operation, the system performs post-training operations on the DNN to identify effective execution paths through the DNN to produce desired computational results. While performing the post-training operations, the system first evaluates an inference of the DNN across a test data set and stores associated DNN activations (step 402). Next, the system selects statistically relevant execution paths through the DNN based on the DNN activations (step 404). Finally, the system generates the runtime metadata based on the selected execution paths through the DNN, wherein the DNN metadata identifies portions of the DNN to be selectively executed at runtime (step 406).

Figure 5:
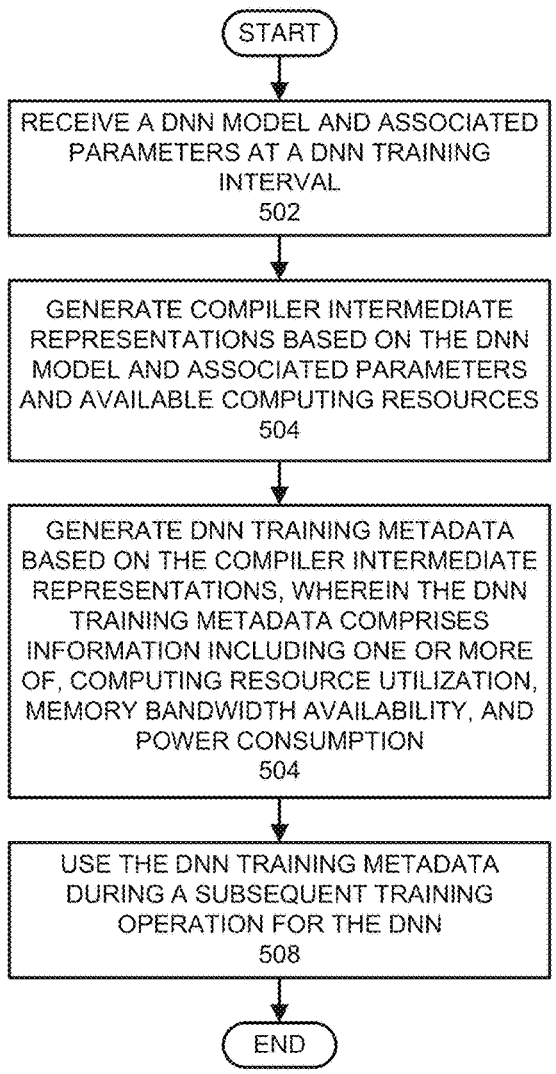
FIG. 5 presents a flow chart illustrating operations performed while generating DNN runtime metadata to facilitate training a DNN in accordance with the disclosed embodiments.

FIG. 5 presents a flow chart illustrating operations performed while generating DNN runtime metadata to facilitate training a DNN in accordance with the disclosed embodiments. During operation, the system receives a DNN model and associated parameters at a DNN training interval (step 502). Next, the system generates compiler intermediate representations based on the DNN model and associated parameters and available computing resources (step 504). The system then generates the DNN metadata based on the compiler intermediate representations, wherein the DNN metadata comprises information, including one or more of computing resource utilization, memory bandwidth availability, and power consumption (step 506). Finally, the system uses the DNN metadata during a subsequent training operation for the DNN (step 508).

Figure 6:
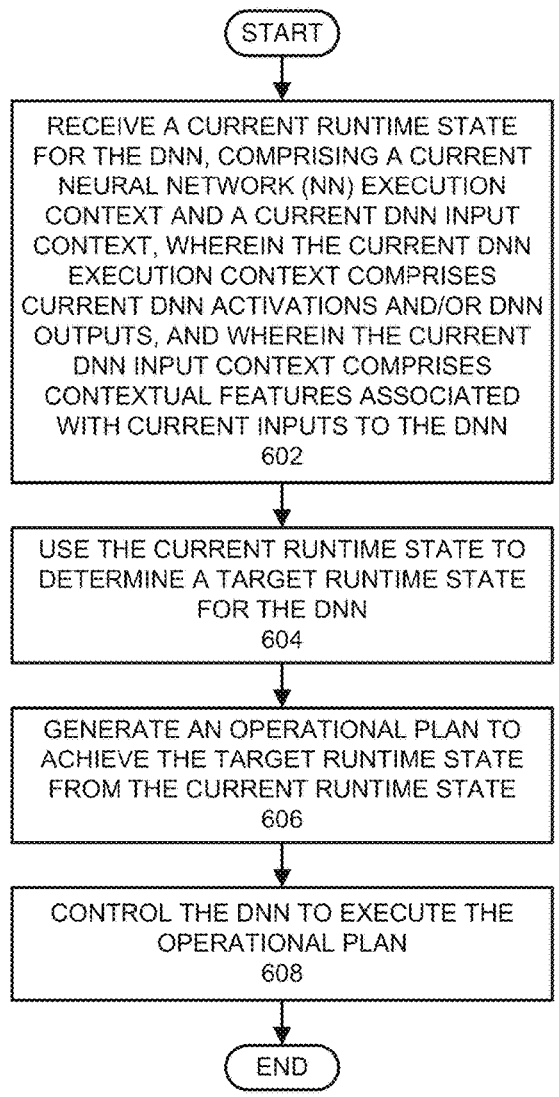
FIG. 6 presents a flow chart illustrating operations performed while executing a DNN based on a current operational context in accordance with the disclosed embodiments.

FIG. 6 presents a flow chart illustrating operations performed while executing a DNN based on a current operational context in accordance with the disclosed embodiments. During operation, the system receives a current runtime state for the DNN, comprising a current neural network (NN) execution context and a current DNN input context, wherein the current DNN execution context comprises current DNN activations and/or DNN outputs, and wherein the current DNN input context comprises contextual features associated with current inputs to the DNN (step 602). Next, the system uses the current runtime state to determine a target runtime state for the DNN (step 604). The system then generates an operational plan to achieve the target runtime state from the current runtime state (step 606). Finally, the system controls the DNN to execute the operational plan (step 608).

Figure 7:
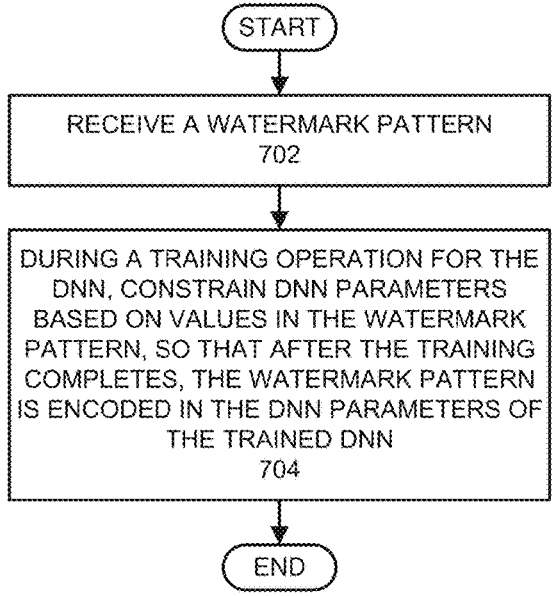
FIG. 7 presents a flow chart illustrating operations performed while watermarking a DNN in accordance with the disclosed embodiments.

FIG. 7 presents a flow chart illustrating operations performed while watermarking a DNN in accordance with the disclosed embodiments. During operation, the system receives a watermark pattern (step 702). Next, during a training operation for the DNN, the system constrains DNN parameters based on values in the watermark pattern, so that after the training completes, the watermark pattern is encoded in the DNN parameters of the trained DNN (step 704).

Figure 8:
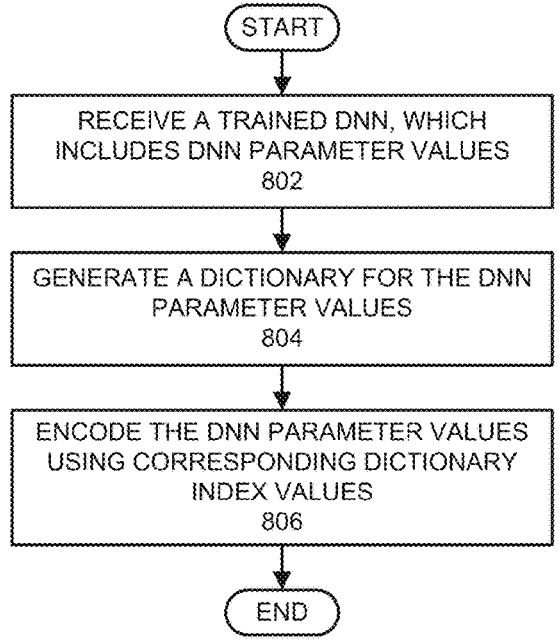
FIG. 8 presents a flow chart illustrating operations performed while compressing a DNN in accordance with the disclosed embodiments.

FIG. 8 presents a flow chart illustrating operations performed while compressing a DNN in accordance with the disclosed embodiments. During operation, the system receives a trained DNN, which includes DNN parameter values (step 802). Next, the system generates a dictionary for the DNN parameter values (step 804). Finally, the system encodes the DNN parameter values using corresponding dictionary index values (step 806).

Figure 9:
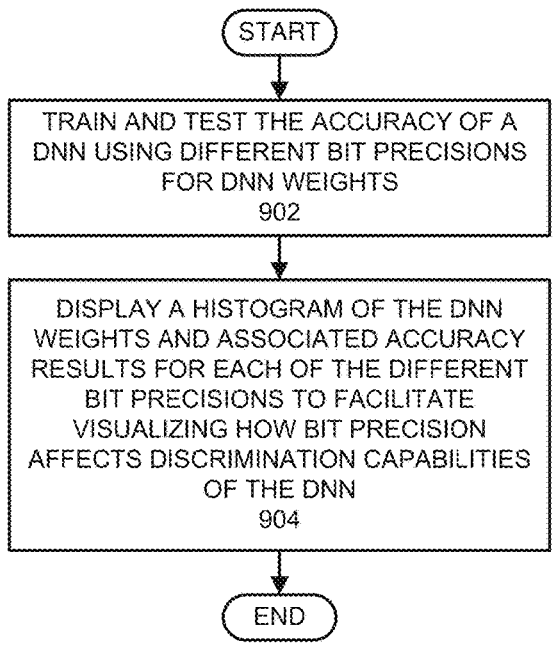
FIG. 9 presents a flow chart illustrating operations performed while generating a visualization of DNN training results across different bit precisions in accordance with the disclosed embodiments.

FIG. 9 presents a flow chart illustrating operations performed while facilitating visualization of DNN training results across different bit precisions in accordance with the disclosed embodiments. During operation, the system trains and tests the accuracy of a DNN using different bit precisions for DNN weights (step 902). Next, the system displays a histogram of the DNN weights and associated accuracy results for each of the different bit precisions to facilitate visualizing how bit precision affects discrimination capabilities of the DNN (step 904).

Figure 10:
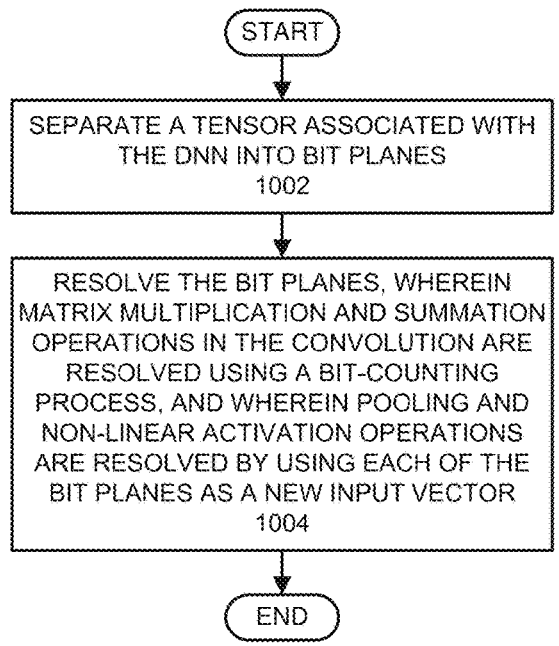
FIG. 10 presents a flow chart illustrating operations performed while processing neural network inferences in a DNN using bit planes in accordance with the disclosed embodiments.

FIG. 10 presents a flow chart illustrating operations performed while processing neural network inferences in a neural network (DNN) using bit planes in accordance with the disclosed embodiments. During operation, the system separates a tensor associated with the DNN into bit planes (step 1002). The system then resolves the bit planes, wherein matrix multiplication and summation operations in the convolution are resolved using a bit-counting process, and wherein pooling and non-linear activation operations are resolved by using each of the bit planes as a new input vector (step 1004).

Figure 11:
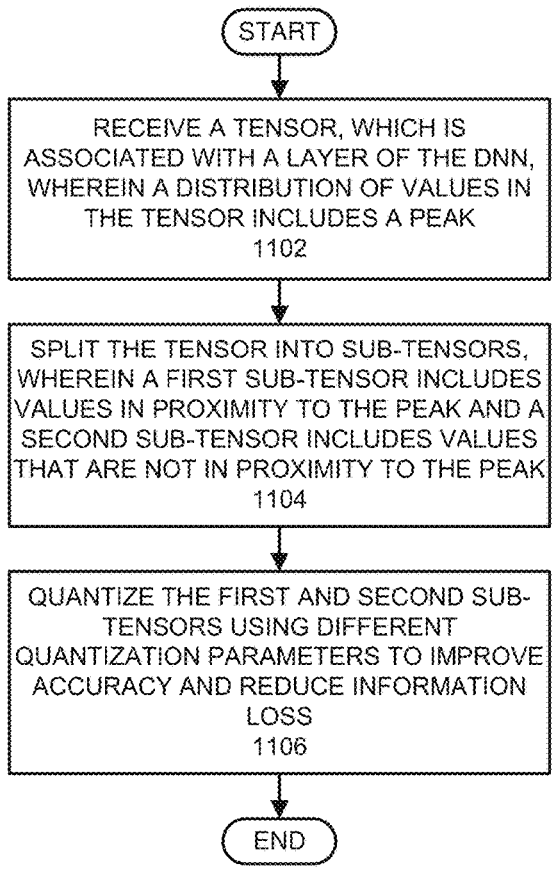
FIG. 11 presents a flow chart illustrating operations performed while quantizing a DNN based on tensor splitting to reduce information loss in accordance with the disclosed embodiments.

FIG. 11 presents a flow chart illustrating operations performed while quantizing a DNN based on tensor splitting to reduce information loss. During operation, the system receives a tensor, which is associated with a layer of the DNN, wherein a distribution of values in the tensor includes a peak (step 1102). Next, the system splits the tensor into sub-tensors, wherein a first sub-tensor includes values in proximity to the peak and a second sub-tensor includes values that are not in proximity to the peak (step 1104). Finally, the system separately quantizes the first and second sub-tensors using different quantization parameters to improve accuracy and reduce information loss (step 1106).

Figure 12:
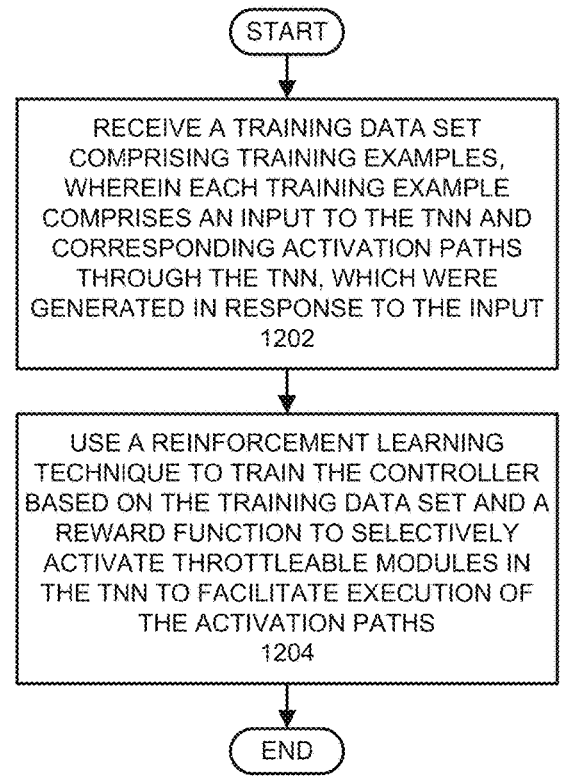
FIG. 12 presents a flow chart illustrating operations performed while training a controller to manage runtime execution of a TNN.

FIG. 12 presents a flow chart illustrating operations performed while training a controller to manage runtime execution of a TNN. During operation, the system receives a training data set comprising training examples, wherein each training example comprises an input to the TNN and corresponding activation paths through the TNN, which were generated in response to the input (step 1202). Next, the system uses a reinforcement learning technique to train the controller based on the training data set and a reward function to selectively activate throttleable modules in the TNN to facilitate execution of the activation paths (step 1204).

Generating and Executing a DNN Based on Target Runtime Parameters

An application using a DNN may have target runtime parameters that are desirable. For example, it may have desired operational conditions such as frame rate, throughput, and latency. It may have desired resource utilization, such as memory bandwidth, power consumption, and number of processor cores. It may have desired accuracy of results. However, constraints on edge devices that execute the DNN, with respect to size, weight, and power, can limit the ability for the DNN to operate within the desired target runtime parameters.

In order to run the DNN within the constraints of the target runtime parameters, the DNN needs to be modified and operate in a constrained runtime mode that meets the available budget (e.g., in terms of size, weight, power) for the edge device. Hence, during operation, our new DNN system uses an original model to generate a context-specific model that operates within the available budget defined by the target runtime parameters. The DNN system then runs the context-specific model as a proxy for the original model. When there is insufficient confidence in the accuracy of the results produced by the context-specific model, the DNN system can run the original model to achieve the desired accuracy.

Figure 19:
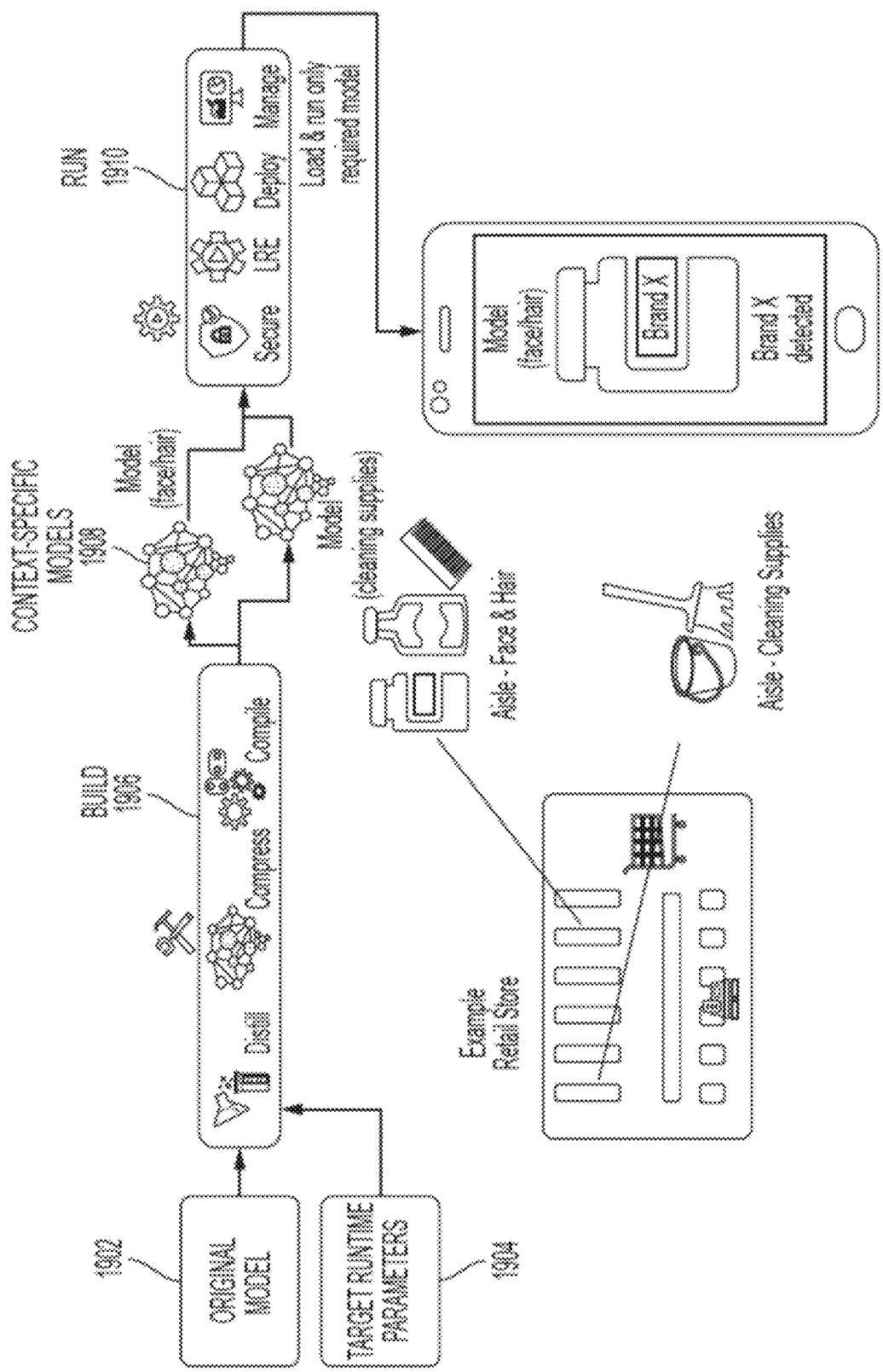
FIG. 19 illustrates a context-aware system for dynamic runtime execution of a DNN in accordance with the disclosed embodiments.

FIG. 19 illustrates an example of dynamic runtime execution of the DNN system. As illustrated in FIG. 19, an original model 1902, which was developed for the deep cloud, cannot run within constraints of the target runtime parameters 1904 for edge devices. For example, the original model 1902's size and processing latency while executing on an edge device, such as a smartphone, may exceed the desired memory footprint and processing time.

In order to run on the smartphone, the model can go through a build process 1906 and a run process 1910 to condition it for dynamic runtime execution. The build process 1906 includes workflows for distill, compress, and compile operations, to optimize the DNN model. The result of the build process 1906 is context-specific models 1908 and associated runtime engines (not shown) that are able to run on a smartphone within constraints of the target runtime parameters.

The context-specific models 1906 can be generated using a knowledge distillation process in a distill workflow. In the distill workflow, the original model, which was developed for the cloud, serves as a teacher model, while the context-specific models 1908 are student models that learn from the teacher model. By using a distillation-loss parameter within a training loss function, the training process for a student model can be guided to learn similar representations to those in the teacher model.

Note that a context-specific model 1908 can be configured to have fewer parameters (e.g. less width or depth of layers) than the original model 1902, so that the context-specific model 1908 can run within constraints of the target runtime parameters. A context-specific model 1908 can also have a similar DNN architecture as the original model (e.g. both can be ResNets, but of different size), or they may have different architectures (e.g. the original model 1902 is ResNet and the context-specific model 1908 is MobileNet). The distill workflow transfers the knowledge learned in the original model 1902 into the context-specific model 1908 such that the overall runtime accuracy is maintained.

The input and output ranges for the context-specific model 1908 can also be modified to run within the constraints of the target runtime parameters 1904. In FIG. 19, the original model 1902, which is input to the build process 1906, may be able to process large images and classify thousands of objects. The distill workflow can reduce the input resolution to a smaller image size to reduce processing latency. Similarly, the distill workflow can reduce the number of classified objects to only a few objects. For example, the original model 1902 may classify all objects in a retail store using processors in the deep cloud. The generated context-specific model 1908 may only classify objects that are located on a single aisle (e.g. face/hair products, or cleaning supplies). Note that the build workflow may produce a number of different context-specific models 1908 to meet various target runtime parameters.

Referring to FIG. 19, two context-specific models 1908 are generated, one for face/hair products, and another for cleaning supplies. These context-specific models 1908 are available to run on the smartphone edge device. While in the face/hair aisle in the retail store, only the context-specific model 1908 for face/hair is used, and while in the cleaning supplies aisle in the retail store, only the context-specific model 1908 for cleaning supplies is used. The constraints of the target runtime parameters 1904 are met because the context-specific models 1908 are much smaller sized and run faster than the larger original model 1902, which is more comprehensive. Moreover, computations are reduced for the context-specific model 1908 because there are fewer object features to learn and the context-specific model 1908 can learn the representations using fewer DNN parameters.

Different context-specific models 1908 can be selected based on the specific context for the application running on the smartphone edge devices. For example, locating beacons (e.g. GPS or Wi-Fi maps) may be used to provide context to switch among a number of different context-specific models 1908.

Alternatively, if the current context-specific model 1908 (e.g. for cleaning supplies) is no longer producing high-confidence classification results, the video or image data can be sent to run on the original model 1902 to provide higher confidence results. Given the result from the original model 1902, the appropriate context-specific model 1908 (for face/hair products) can be used to replace the current context-specific model 1908 (for cleaning supplies). In this way, the original model 1902 is used to provide a new context, and the application can continue to run with the new context-specific model 1908 (for face/hair products).

Note that the original model 1902 can reside on the smartphone with the context-specific models 1908, and they can operate collectively under an operational plan, wherein the original model 1902 provides context, and the context-specific models 1908 provide most of the DNN results. In this way, the original model 1902 and context-specific models 1908 switch automatically and seamlessly within the application without requiring user intervention. Moreover, the DNN developer does not need to manually create the context-specific models 1908, but instead uses the build process 1906 to automatically generate context-specific models 1908 to run under different contexts.

Note that the build process 1906 may include a compress workflow, which provides quantization to reduce the bit-precision of the context-specific model 1908. The build process 1906 may also include a compile workflow to generate an operational plan and optimize the runtime executable code for the target edge device hardware.

The original model 1902 may alternatively reside at a remote location from the context-specific model 1908. For example, the original model 1902 may reside in the edge network to determine contexts to change the context-specific models 1908. In this case, the original model 1902 may not need to run until the confidence scores for results of the context-specific model 1908 are lower than is specified by the target runtime parameters. Note that the results from the context-specific model 1908 and the video/image data on the smartphone edge device can be sent remotely to the original model 1902 for processing. The operational plan can be used to switch among context-specific models 1908 based on the context.

In FIG. 19, the run process 1910 may include a secure workflow to verify the authenticity of the context-specific models 1908. The run process 1910 may also include a latent runtime engine (LRE) that encapsulates the operational plan to change context-specific models 1908 based on the detected context. The run process 1910 may also contain a deploy workflow to send context-specific models 1908 to the smartphone edge device. The run process 1910 may additionally contain a manage workflow that routes results from the edge devices between the original model 1902 and the context-specific models 1908.

A key element for the dynamic runtime execution of the DNN model is the ability to generate context-specific models 1908 that are more efficient than the original model 1902, and which are able to run on the edge devices. The dynamic runtime execution involves using an operational plan that controls the original model 1902 and the context-specific models 1908 while executing in tandem to provide DNN results that meet constraints imposed by the target runtime parameters 1904.

Figure 20:
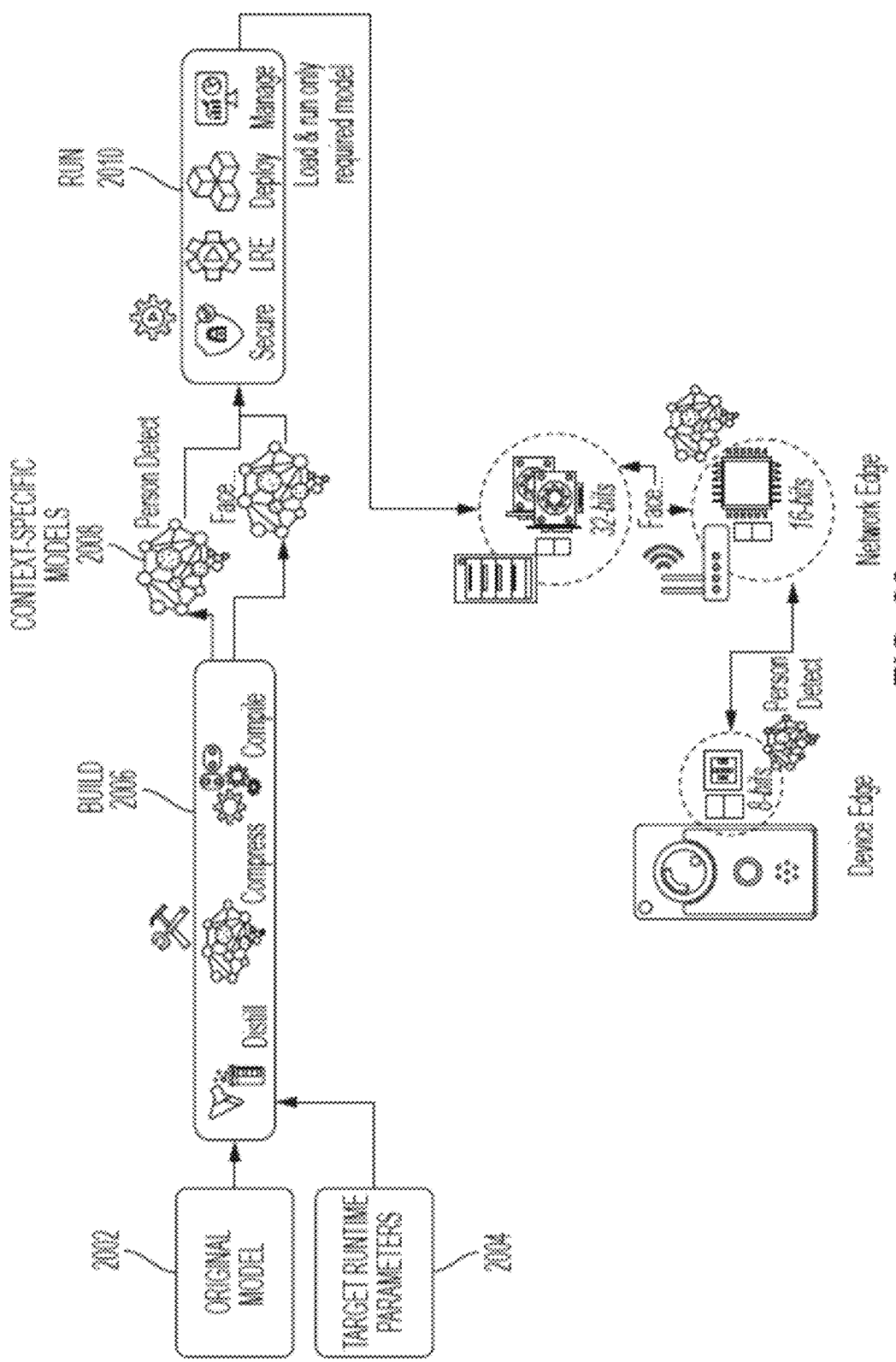
FIG. 20 illustrates a compute-aware system for dynamic runtime execution of a DNN in accordance with the disclosed embodiments.

FIG. 20 illustrates another example of dynamic runtime execution of the DNN model. Similar to the example in FIG. 19, in order to run on the edge devices, the model can go through a build process 2006 and a run process 2010 to condition the model for dynamic runtime execution. In the example shown in FIG. 20, two context-specific models 2008 are generated; one for person detection, and another for face recognition. The context-specific model 2008 for person detection can run on a video doorbell edge device, while the context-specific model 2008 for face recognition can run on the network edge (e.g., a content-delivery-network or CDN).

The example in FIG. 20 illustrates compute-aware dynamic runtime execution. It is compute aware because the target runtime parameters 2004 describe the compute capability of the edge device or edge network. For example, the video doorbell may have an 8-bit processor, which is sufficient to support a context-specific model 2008 for person detection, but not face recognition, which requires a biometric database.

The build process 2006 includes distill, compress, and compile workflows, which convert models for the deep cloud to run on the edge. The run process 2010 includes secure, LRE, deploy, and manage workflows, to execute the operational plan for the original model 2002 and the context-specific models 2008 (person-detection and facial-recognition models)

When the confidence of detection for a context-specific model 2008 running on the video doorbell edge device is low, a new context-specific model 2008, generated with the build process 2006 can be deployed on the video doorbell. Video and images that produce low confidence scores can be used to retrain the DNN model using an active learning approach to continue refining the overall DNN model accuracy.

Note that the dynamic runtime execution of the DNN model using the original model 2002 and generated context-specific models 2008 enables processing closer to the data source. The build process 2006 and the run process 2010 help adapt the original model 2002 for processing in the edge location. Therefore, the context-specific models 2008 are generated to meet or exceed the constraints of the target runtime parameters 2004 for any processor in a hierarchy of computing nodes. Note that processing closer to the data source enables lower latency responses without the need to transfer sensor data to a centralized location; this dynamic runtime execution technique enables the model to move closer to the data source.

Having models move to different locations in the hierarchy of computing nodes can help track objects in motion. For example, if a tracking application has detected a blue sedan in the proximity of IOT sensors in the hierarchy of computing nodes, then a specific model for blue sedans, generated in the build process 2006 from an original model 2002, can be deployed in the run process 2010, as described previously.

In another application example, models that are personalized to a user may also be moved or loaded into TOT devices that are in spatial proximity to the user. For example, when a user enters a room, an application may load models that are optimized based on the user's preferences onto the hierarchy of computing nodes in the room. Note that user preference models may be related to speech recognition, recommendation engines, and even biometrics. They may also include specific personalized health information that can be encrypted with the secure workflow.

The generated context-specific models 2008 can be tuned to have a very tiny compute and memory footprint. They can also be tuned to run with very low latency and consume little power. As such, these context-specific models 2008 can operate efficiently for applications running on edge devices. For example, a user may tend to turn off applications that use larger models because they consume power and reduce the time between battery charges. In comparison, context-specific models 2008 that are tiny can run more often and provide sufficient performance for the application without the burden of loading and processing the larger original model 2002.

In another application example, context-specific models can be loaded onto devices to run model inferences locally with real-time sensor data. The results are used to wake up additional services running remotely in the hierarchy of computing nodes. The context-specific models may be detecting key audio signatures or trigger words. Once detected, a remote service is enabled to process subsequent collection of sensor data. Then, a new context-specific model may be moved and loaded into the device to setup a new trigger event. For example, the new context-specific model may be visual wakeup model that triggers if specific object is detected. The sequence of trigger events, and the associated context-specific models used, can be encapsulated in the operational plan as a cascaded sequence.

Figure 21:
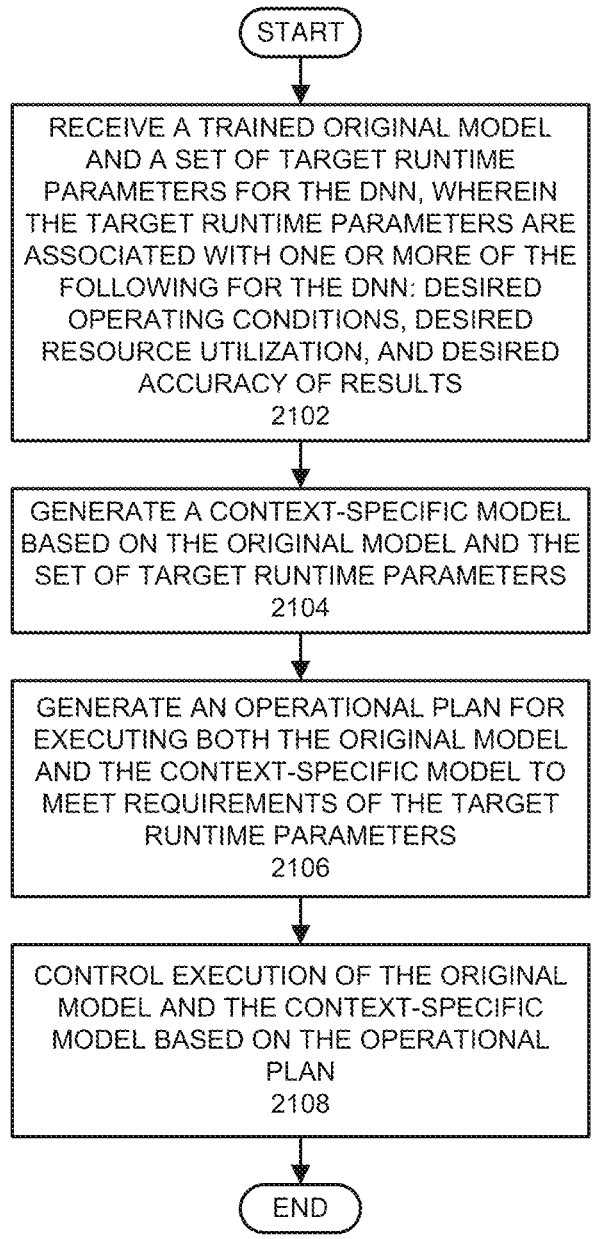
FIG. 21 presents a flow chart illustrating a process for generating and executing a DNN based on target runtime parameters in accordance with the disclosed embodiments.

Finally, FIG. 21 presents a flow chart illustrating the process for generating and executing a DNN based on target runtime parameters in accordance with the disclosed embodiments. During operation, the system receives a trained original model and a set of target runtime parameters for the DNN, wherein the target runtime parameters are associated with one or more of the following for the DNN: desired operating conditions, desired resource utilization, and desired accuracy of results (step 2102). Next, the system generates a context-specific model based on the original model and the set of target runtime parameters (step 2104). The system also generates an operational plan for executing both the original model and the context-specific model to meet requirements of the target runtime parameters (step 2106). Finally, the system controls execution of the original model and the context-specific model based on the operational plan (step 2108).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating and executing a deep neural network (DNN) based on target runtime parameters, comprising:
receiving a trained original model and a set of target runtime parameters for the DNN, wherein the target runtime parameters are associated with one or more of the following for the DNN: desired operating conditions, desired resource utilization, and desired accuracy of results;
generating a context-specific model based on the original model and the set of target runtime parameters;
generating an operational plan for executing both the original model and the context-specific model to meet requirements of the target runtime parameters; and
controlling execution of the original model and the context-specific model based on the operational plan; and
deploying and executing the context-specific model at a location in a hierarchy of computing nodes, wherein the location is determined based on the target runtime parameters.

2. The method of claim 1, wherein the target runtime parameters are generated based on current operating conditions at the location in a hierarchy of computing nodes.

3. The method of claim 1, wherein information regarding the target runtime parameters, locations of the original model and the context-specific model in the hierarchy of computing nodes, and results produced by the original model and the context-specific model are stored at a common location in the hierarchy of computing nodes, wherein the information is used to control execution of the operational plan.

4. The method of claim 1, wherein the operational plan involves executing and obtaining results from the original model when results from the context-specific model do not meet requirements of the target runtime parameters.

5. The method of claim 4, wherein the original model and the context-specific model are executed on different devices in the hierarchy of computing nodes.

6. The method of claim 1, wherein the context-specific model is moved to a location in the hierarchy of computing nodes, which is closer to a data source for the context-specific model.

7. The method of claim 1, wherein the context-specific model is designed to operate within constraints of computing capabilities of a specific device in the hierarchy of computing nodes.

8. The method of claim 1, wherein the context-specific model performs inference operations that are specific to a particular user, and wherein the original model performs inference operations that are not specific to a particular user.

9. The method of claim 1, wherein weights in the context-specific model are generated by quantizing corresponding weights in the original model, so that the weights in the context-specific model have a lower bit-precision than the corresponding weights in the original model.

10. The method of claim 1, wherein the context-specific model is trained to operate over a subset of an input range and/or a subset of an output range of the original model.

11. The method of claim 1, wherein the context-specific model is smaller than the original model, and wherein the context-specific model is generated through a knowledge distillation technique, which uses the original model to train the context-specific model.

12. The method of claim 1, wherein the operational plan is generated to achieve one or more of the following:
maximizing classification accuracy of the DNN;
minimizing latency involved in executing the DNN to produce results;
minimizing computational operations performed while executing the DNN; and
minimizing power consumption while executing the DNN.

13. The method of claim 1, wherein generating the context-specific model involves generating different context-specific models based on different sets of runtime parameters.

14. The method of claim 13, wherein the operational plan switches among executing different context-specific models as an operating environment of the DNN changes.

15. A non-transitory computer-readable storage medium storing instructions that when executed by a computer cause the computer to perform a method for generating and executing a deep neural network (DNN) based on target runtime parameters, the method comprising:
receiving a trained original model and a set of target runtime parameters for the DNN, wherein the target runtime parameters are associated with one or more of the following for the DNN: desired operating conditions, desired resource utilization, and desired accuracy of results;
generating a context-specific model based on the original model and the set of target runtime parameters;
generating an operational plan for executing both the original model and the context-specific model to meet requirements of the target runtime parameters; and
controlling execution of the original model and the context-specific model based on the operational plan; and
deploying and executing the context-specific model at a location in a hierarchy of computing nodes, wherein the location is determined based on the target runtime parameters.

16. The non-transitory computer-readable storage medium of claim 15, wherein the target runtime parameters are generated based on current operating conditions at the location in a hierarchy of computing nodes.

17. The non-transitory computer-readable storage medium of claim 15, wherein information regarding the target runtime parameters, locations of the original model and the context-specific model in the hierarchy of computing nodes, and results produced by the original model and the context-specific model are stored at a common location in the hierarchy of computing nodes, wherein the information is used to control execution of the operational plan.

18. The non-transitory computer-readable storage medium of claim 15, wherein the operational plan involves executing and obtaining results from the original model when results from the context-specific model do not meet requirements of the target runtime parameters.

19. The non-transitory computer-readable storage medium of claim 18, wherein the original model and the context-specific model are executed on different devices in the hierarchy of computing nodes.

20. The non-transitory computer-readable storage medium of claim 15, wherein the context-specific model is moved to a location in the hierarchy of computing nodes, which is closer to a data source for the context-specific model.

21. The non-transitory computer-readable storage medium of claim 15, wherein the context-specific model is designed to operate within constraints of computing capabilities of a specific device in the hierarchy of computing nodes.

22. The non-transitory computer-readable storage medium of claim 15, wherein the context-specific model performs inference operations that are specific to a particular user, and wherein the original model performs inference operations that are not specific to a particular user.

23. The non-transitory computer-readable storage medium of claim 15, wherein weights in the context-specific model are generated by quantizing corresponding weights in the original model, so that the weights in the context-specific model have a lower bit-precision than the corresponding weights in the original model.

24. The non-transitory computer-readable storage medium of claim 15, wherein the context-specific model is trained to operate over a subset of the input range and/or a subset of output range of the original model.

25. The non-transitory computer-readable storage medium of claim 15, wherein the context-specific model is smaller than the original model, and wherein the context-specific model is generated through a knowledge distillation technique, which uses the original model to train the context-specific model.

26. The non-transitory computer-readable storage medium of claim 15, wherein the operational plan is generated to achieve one or more of the following:
   maximizing classification accuracy of the DNN;
   minimizing latency involved in executing the DNN to produce results;
   minimizing computational operations performed while executing the DNN; and
   minimizing power consumption while executing the DNN.

27. The non-transitory computer-readable storage medium of claim 15, wherein generating the context-specific model involves generating different context-specific models based on different sets of runtime parameters.

28. The non-transitory computer-readable storage medium of claim 27, wherein the operational plan switches among executing different context-specific models as an operating environment of the DNN changes.

29. A system that generates and executes a deep neural network (DNN) based on target runtime parameters, comprising:
   at least one processor and at least one associated memory; and
   a processing mechanism that executes on the at least one processor, wherein during operation, the processing mechanism:
      receives a trained original model and a set of target runtime parameters for the DNN, wherein the target runtime parameters are associated with one or more of the following for the DNN: desired operating conditions, desired resource utilization, and desired accuracy of results;
      generates a context-specific model based on the original model and the set of target runtime parameters;
      generates an operational plan for executing both the original model and the context-specific model to meet requirements of the target runtime parameters;
      controls execution of the original model and the context-specific model based on the operational plan; and
      deploys and executes the context-specific model at a location in a hierarchy of computing nodes, wherein the location is determined based on the target runtime parameters.

* * * * *